(12) United States Patent
Ishii et al.

(10) Patent No.: US 8,014,923 B2
(45) Date of Patent: Sep. 6, 2011

(54) TRAVEL DEVICE

(75) Inventors: Shinji Ishii, Yokohama (JP); Ikuo Yamano, Yokohama (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/692,221

(22) Filed: Jan. 22, 2010

(65) Prior Publication Data

US 2010/0121538 A1    May 13, 2010

Related U.S. Application Data

(63) Continuation of application No. 11/984,154, filed on Nov. 14, 2007, now abandoned.

(30) Foreign Application Priority Data

Nov. 15, 2006  (JP) ................. 2006-309410

(51) Int. Cl.
*B62D 37/00* (2006.01)
(52) U.S. Cl. ........... 701/49; 701/124; 180/6.5; 180/218; 180/282; 280/5.509
(58) Field of Classification Search ............ 180/218, 180/282, 21, 6.48, 6.5; 701/49, 124; 340/440; 280/5.508–5.51
See application file for complete search history.

(56) References Cited

U.S. PATENT DOCUMENTS

| 4,974,863 | A | * | 12/1990 | Patin | ................. | 280/62 |
| 5,971,091 | A | | 10/1999 | Kamen et al. | | |
| 2006/0231313 | A1 | * | 10/2006 | Ishii | ................. | 180/218 |
| 2006/0260857 | A1 | | 11/2006 | Kakinuma et al. | | |

FOREIGN PATENT DOCUMENTS

| JP | 6-40204 | | 2/1994 |
| JP | 2005-22631 | | 1/2005 |
| JP | 2005-094858 | A | 4/2005 |
| JP | 2005-138630 | | 6/2005 |
| JP | 2006-001385 | A | 1/2006 |
| JP | 2006001385 | A * | 1/2006 |
| WO | WO 2004110854 | A1 * | 12/2004 |

* cited by examiner

*Primary Examiner* — Khoi Tran
*Assistant Examiner* — Spencer Patton
(74) *Attorney, Agent, or Firm* — Kenyon & Kenyon LLP

(57) ABSTRACT

A travel device includes a plurality of wheels disposed parallel to one another, a step plate mounted between the wheels, a handle mounted to the step plate, and a driving motor that allows the step plate and handle to tilt in a roll axis direction. The device further includes a control unit that drives the motor so as to maintain the step plate horizontal or the handle vertical. The device also includes a measurement unit that measures a shift operation of the step plate or the handle. The plurality of wheels may change direction based on the value determined by the measuring unit.

2 Claims, 38 Drawing Sheets

MOTOR ROTATION SPEED COMMAND ωref[rad/sec]

HANDLE TORQUE

MOTOR TORQUE COMMAND Tref[Nm]

MOTOR ROTATION OUTPUT (ROTOR ROTATION ANGLE) $\theta$m[rad]

HANDLE TORQUE ESTIMATION Tidr

TRAVEL DEVICE

This is a continuation of application Ser. No. 11/984,154 filed 14 Nov. 2007 now abandoned, which claims priority to Japanese Patent Applications No. 2006-309410 filed 15 Nov. 2006, the contents of which are incorporated herein by reference.

BACKGROUND OF THE INVENTION

1. Field of the Invention

The present invention relates to a travel device suitable for application to a coaxial two-wheel vehicle including two wheels disposed on the same axis center line, for example. Particularly, the present invention realizes active control of the tilt of a step plate and/or a handle with use of a tilt driving unit so as to maintain the stability while traveling. The present invention is also applicable to a travel device including three or more wheels.

2. Description of Related Art

A coaxial two-wheel vehicle of a related art implements a posture control of a vehicle mainly in a pitch axis direction by detecting the tilt of the vehicle with a use of a plurality of gyroscopes or the like. For example, a related reference U.S. Pat. No. 5,971,091 discloses such a technique.

As another example, there is a device that includes a handle or a step which is constrained to a neutral position by a restoring force of a spring or the like, detects their absolute tilt angle with respect to a gravitational axis or relative tilt angle with respect to a vehicle base and controls each wheel so as to implement a rotating operation according to the detected angle. For example, a related reference Japanese Patent Application No. 2005-117365 filed on Apr. 14, 2005 (Kakinuma, U.S. patent application Ser. No. 11/402,975 filed on Apr. 13, 2006, Pub. No. US 2006/0260857) discloses such a technique.

However, the above patent references do not describe a technique of actively controlling the tilt of at least one of a step plate and a handle to enable stable traveling, which is the main point of the present invention.

As a vehicle that travels with two wheels with a person on board, a coaxial two-wheel vehicle as disclosed in the above related references is known, for example. Specifically, Kakinuma teaches a technique of using a handle or a step that is constrained to a neutral position by a restoring force of a spring or the like, detecting their absolute tilt angle with respect to a gravitational axis or relative tilt angle with respect to a vehicle base and controlling each wheel so as to implement a rotating operation according to the detected angle.

However, if such a vehicle travels straight on a canted road having a lateral inclination in the direction orthogonal to the inclination, it causes the following problems.

Specifically, when using the absolute tilt angle for a rotation control, the neutral position of a handle by a restoring force of a spring or the like is as shown in FIG. 21A. In order to bring the absolute angle of the handle to zero so as to allow the vehicle to move straight, a passenger needs to actively tilt the handle against the spring force to realize the state as shown in FIG. 21B. Such an operation requires enough physical strength and skill to keep tilting the handle against the spring force. Further, if a passenger fails to make an appropriate control of the handle, it can lead to an unintended behavior of the vehicle.

On the other hand, when using the relative tilt angle for a rotation control, the vehicle moves straight in the state as shown in FIG. 21A in which a passenger exerts no force on the handle. However, because the vehicle tilts with respect to the gravitational axis in this state, it is difficult for the passenger to adjust a left-right balance if a lateral inclination of a road is large. Further, when the vehicle rotates on the spot on a slope, the neutral angle of the handle changes with respect to the ground according to a change in the tilt of the vehicle base in the roll axis direction, and therefore a passenger needs to manipulate the vehicle by changing a relative position between his/her own body and the handle.

Further, when a passenger places one foot on a step upon getting on the vehicle having such a structure, the step and the handle tilt due to the load imbalance between right and left on the step as shown in FIG. 21C, and the tilt causes an accidental rotation control. It is thus difficult for a passenger to get on or off the vehicle.

SUMMARY OF THE INVENTION

The present invention has been accomplished to solve the above problems, and one object of the present invention is to enable easier manipulation without requiring skill when proceeding straight on a canted road having a lateral inclination in the direction orthogonal to the inclination, for example. Another object of the present invention is to allow a passenger to get on and off a vehicle easily.

To these ends, according to one aspect of the present invention, there is provided a travel device that includes a servo motor to enable a control of the tilt of a step or a handle in a roll axis direction, calculates the tilt of the step or the handle in the roll axis direction with respect to a gravitational axis using a posture sensor or a position sensor mounted to a main body, and makes a control so that the tilt of the step or the handle is always parallel on the gravitational axis.

A passenger can thereby maintain his/her posture vertical to the horizontal plane without applying any control force to the handle in spite of a slope of a road, thus achieving natural rotation and forward motion.

The above and other objects, features and advantages of the present invention will become more fully understood from the detailed description given hereinbelow and the accompanying drawings which are given by way of illustration only, and thus are not to be considered as limiting the present invention.

DETAILED DESCRIPTION OF THE PREFERRED EMBODIMENTS

According to one aspect of the present invention, there is provided a travel device that includes a plurality of wheels disposed in parallel, a step plate mounted between the plurality of wheels for a driver to place feet, and a handle mounted vertically to the step plate. At least one of the step plate and the handle is capable of tilting in a roll axis direction. The travel device further includes a tilt driving unit to drive at least one of the step plate and the handle to tilt in the roll axis direction and a control unit to control the tilt driving unit, and controls the tilt driving unit so as to maintain the step plate in a horizontal position or to maintain the handle in a vertical position.

According to another aspect of the present invention, the above travel device further includes a detection unit to detect an inclination of a road. The device supplies a value of an inclination detected by the detection unit to the control unit and thereby controls the tilt driving unit so as to maintain the step plate in a horizontal position or to maintain the handle in a vertical position.

According to another aspect of the present invention, the above travel device further includes a measurement unit to measure a shift operation of at least one of the step plate and the handle from a neutral position, which is a horizontal position of the step plate or a vertical position of the handle, that is maintained by the tilt driving unit drive. The device changes a traveling direction according to a measured value of the measurement unit by the plurality of wheels.

According to another aspect of the present invention, the above travel device adjusts a resistance force against a shift operation of at least one of the step plate and the handle with use of a control parameter of the control unit for controlling the tilt driving unit and includes a load detection unit to detect a load applied to the step plate, thereby adjusting the control parameter according to a value of a load detected by the load detection unit.

According to another aspect of the present invention, the above travel device adjusts the control parameter of the control unit so as to bring the resistance force to a maximal value when it determines the occurrence of loading or unloading of a driver based on the detection of a load by the load detection unit.

According to another aspect of the present invention, the above travel device includes an estimation unit to estimate a torque exerted to at least one of the step plate and the handle with use of a mathematical model simulating the control unit, and controls the tilt driving unit so as to displace at least one of the step plate and the handle according to a value of a torque estimated by the estimation unit.

Figure 1A:
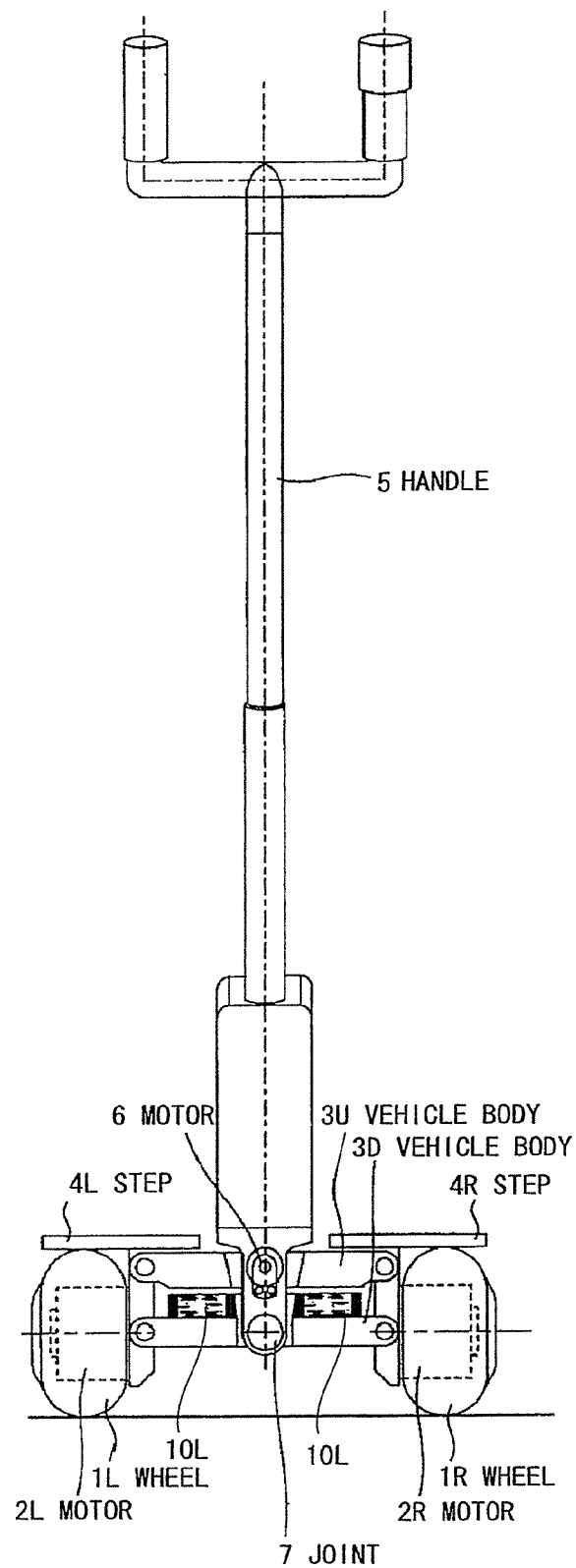
FIG. 1A is a front view showing the structure of a coaxial two-wheel vehicle of one embodiment to which a travel device of the present invention is applied.
Figure 1B:
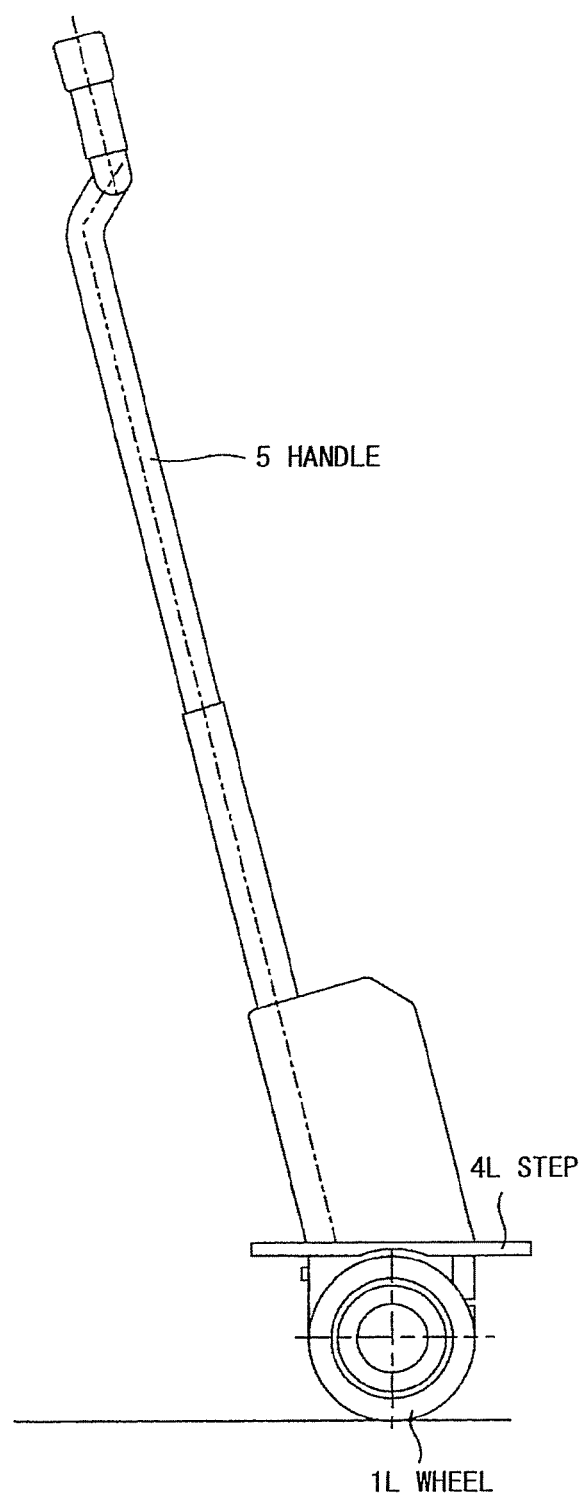
FIG. 1B is a side view showing the structure of a coaxial two-wheel vehicle of one embodiment to which a travel device of the present invention is applied.

The present invention is described hereinafter with reference to the drawings. FIGS. 1A and 1B are a front view and a side view, respectively, showing the structure Of a coaxial two-wheel vehicle of one embodiment to which a travel device of the present invention is applied. In FIGS. 1A and 1B, the overall main structure is substantially the same as that of the device disclosed in Kakinuma.

Referring to FIGS. 1A and 1B, driving units (motors) 2L and 2R are mounted respectively to two wheels 1L and 1R, which are disposed in parallel with each other. The driving units 2L and 2R are coupled by vehicle bodies 3U and 3D, which are upper and lower separate parts. Further, the vehicle bodies 3U and 3D include a circuit device such as a control unit for controlling the driving units 2L and 2R according to information about a tilt of a vehicle detected by a sensor such as a gyroscope, a load on a vehicle, or the like, although not shown.

A step plate on which a driver places their feet is disposed above the vehicle bodies 3U and 3D. The step plate is shown as steps 4L ad 4R, which are left and right separate parts. The steps 4L and 4R are coupled to each other by a link mechanism (not shown) so that they maintain the parallel relationship with each other. Further, a handle 5 is mounted between the steps 4L ad 4R. The handle 5 is capable of tilting in the roll axis direction relative to the vehicle bodies 3U and 3D. The handle 5 and the steps 4L and 4R are coupled to each other by a link mechanism (not shown) so that they maintain the perpendicular relationship to each other.

Furthermore, a driving motor (handle driving motor) 6 as a tilt driving unit for driving the handle 5 so as to tilt along the roll axis is mounted in a joint portion between the handle 5 and the vehicle bodies 3U, 3D, e.g. between the handle 5 and the vehicle body 3U. A joint portion 7 between the handle 5 and the vehicle body 3D can rotate flexibly. The handle 5 can be thereby displaced to the left or right of the vehicle bodies 3U and 3D, thus capable of tilting. The driving motor 6 is controlled so that the handle 5 is always in the perpendicular position by a control unit (not shown) that is mounted to the vehicle bodies 3U, 3D.

A specific structure of a control unit of a one-wheel vehicle model is described hereinafter with reference to the schematic view of FIG. 2. In an actual two-wheel vehicle, a sensor of the step 4 is used in common. Further, a control of the motor 2 that is coupled to the wheel 1 in the illustrated model is implemented by an independent control unit in the wheels 1L and 1R shown in FIG. 1.

Figure 2:
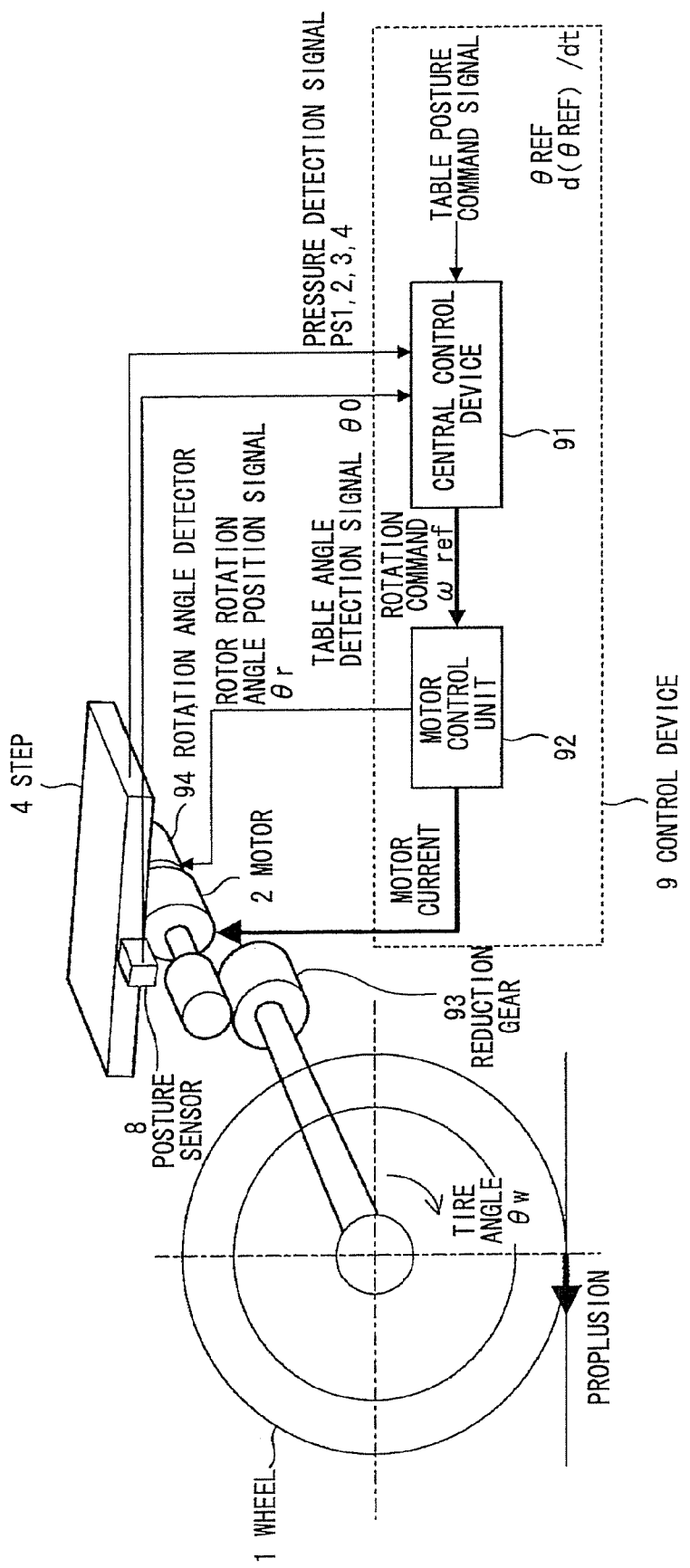
FIG. 2 is a control structure diagram of a one-wheel vehicle model.

Referring to FIG. 2, pressure detection signals PS1, 2, 3, 4 from a pressure sensor (not shown) that is built in the step 4 and a table angle detection signal θ0 from a posture sensor 8, which may be composed of a gyro sensor and an acceleration sensor, that is coupled to the step 4 are supplied to a central control device 91 in a control device 9. Then, an arithmetic operation is performed on the detection signals PS1 to 4 and θ0 with an external table posture command signal θREF {d(θREF)/dt} from a passenger or the like, and an obtained rotation command ωref, is supplied to the motor control unit 92.

The wheel 1 and the motor 2 are connected through a reduction gear 93, and a rotation angle detector 94 is mounted to the motor 2. From the rotation angle detector 94, a rotor rotation angle position signal θr is supplied to the motor control unit 92 in the control device 9. A drive current to the motor 2, which is generated according to the rotation command ωref is feedback-controlled, thereby stabilizing the driving of the wheel 1. The wheel 1 is thereby driven stably and appropriately according to the pressure detection signals PS1 to 4 from a pressure sensor (not shown).

Figure 3:
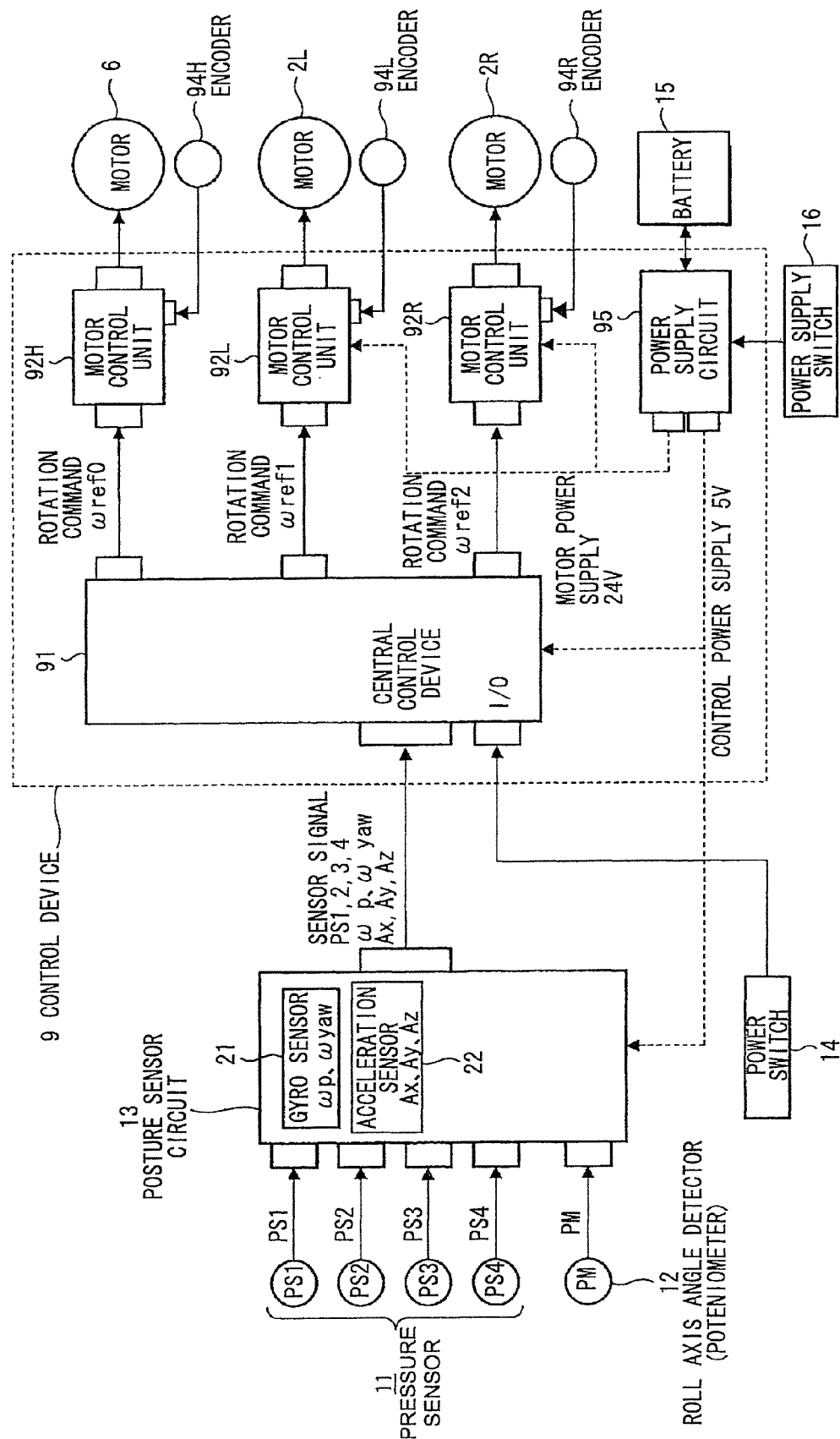
FIG. 3 is a system structure diagram to describe a coaxial two-wheel vehicle of one embodiment.

FIG. 3 shows connections of systems. Referring to FIG. 3, the above-described pressure detection signals PS1 to 4 and a roll axis angle detection signal PM from a roll axis angle gauge (potentiometer, hand lever roll axis angle gauge) 12 that may be mounted to a joint 7 of the handle 5, for example, are supplied to a posture sensor circuit 13. The posture sensor circuit 13 includes a gyro sensor 21 and an acceleration sensor 22. The posture sensor circuit 13 thereby outputs the signals PS1 to 4 and PM, a pitch angle ωp, a yaw angle ωyaw, and X, Y and Z axis angle signals Ax, Ay, Az. The posture sensor circuit 13 is an example of a detection unit for detecting an inclination of a road. A pressure sensor 11 is an example of a load detection unit (load sensors).

The signals PS1 to 4, PM, ωp, ωyaw, Ax, Ay and Az are supplied to the central control device 91 in the control device 9. Further, an actuating signal from a power switch 14 that is placed on a grip of the handle 5 is supplied to the central control device 91. The central control device 91 thereby generates rotation commands ωref1 and ωref2 for the left and right wheels 1L and 1R (not shown), which are then supplied to the motor control units 92L and 92R. Further, signals from the rotation angle detectors 94L and 94R are supplied to the motor control units 92L and 92R, thereby driving the motors 2L and 2R.

A power from a battery 15 is supplied to a power supply circuit 95. A 24V motor power, for example, is supplied from the power supply circuit 95 to the motor control units 92L and 92R, and a 5V control power, for example, is supplied to the posture sensor circuit 13 and the central control device 91. The power supply circuit 95 includes a power switch 16 so as to control power supply to each unit. The motors 2L and 2R are thereby driven, and consequently the wheels 1L and 1R are driven by the motors 2L and 2R, thus enabling a coaxial two-wheel vehicle to travel.

In such a device, a rotation command θref0 for maintain the handle 5 in the vertical position is generated in the central control device 91 and supplied to a motor control unit 92H that controls the driving of the driving motor 6. Further, a signal from a rotation angle detector 94H that is placed for the driving motor 6 is also supplied to the motor control unit 92H. The driving of the driving motor 6 is controlled so as to cancel out the tilt of the steps 4L ad 4R or the like relative to the gravity, which is kept track of in the central control device 91, thereby permitting the handle 5 to stand vertically. The control device 9 is an example of a control unit for controlling the motors 2R and 2L, and the driving motor 6 (tilt driving unit).

Specifically, in the control device shown in FIG. 3, the motor control units 92L, 92R and 92H that are connected to the motors 2L, 2R and 6 that include the rotation angle detectors 94L, 94R and 94H receive motor rotation angles from the rotation angle detectors 94L, 94R and 94H, and control command data according to the signals PS1 to 4 a, PM, ωp, ωyaw, Ax, Ay and Az that are supplied to the central control device 91. The control device thereby calculates a rotation speed of the motor, generates motor current that serves as a torque corresponding to the calculated rotation speed, and thereby generates a tire rotation torque.

Further, the above-described control device detects a vehicle posture based on signals from the gyro sensor and the acceleration sensor that are mounted to the vehicle. Specifically, the control device performs an arithmetic operation to generate a rotation command for the motor so as to maintain the posture of the vehicle with the use of the principle of controlling a posture by an inverted pendulum, the principle of a ZMP (zero moment point) control in a bipedal walking robot control, or the method disclosed in Japanese Unexamined Patent Application Publication No. 2005-94858 by the inventor of the present invention, and transmits the generated rotation command data to the motor control device. Such a feedback control allows the vehicle to maintain its posture, so that the vehicle can travel according to a change in the gravitational posture of a person.

Further, the control device allows the vehicle to rotate by detecting a change in the roll axis angle of the handle 5 and controlling the left and right wheels 1L and 1R at a differential rotation speed in proportion to the roll angle change.

Figure 4A:
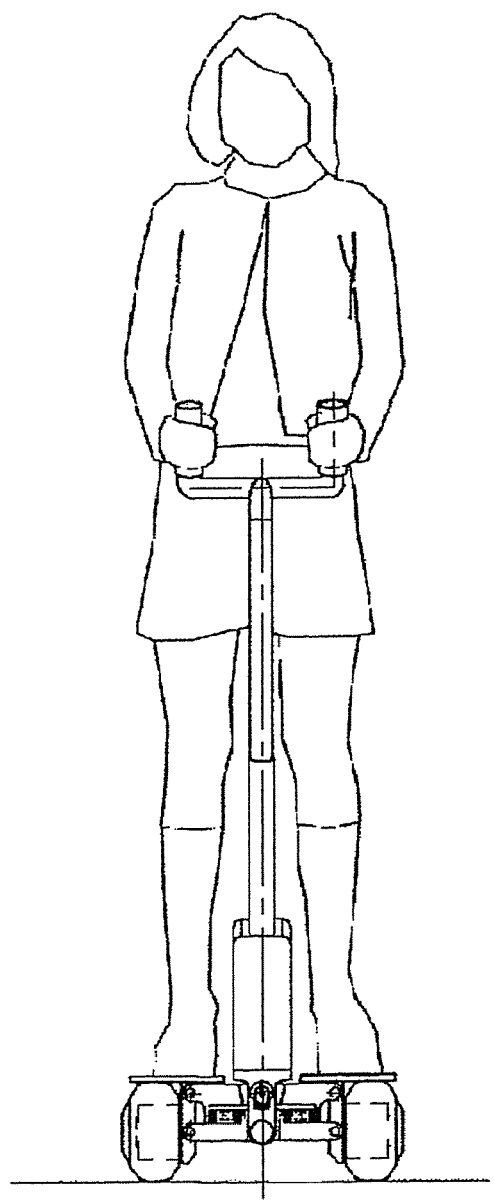
FIG. 4A is a view to describe the operation of a coaxial two-wheel vehicle of one embodiment.
Figure 4B:
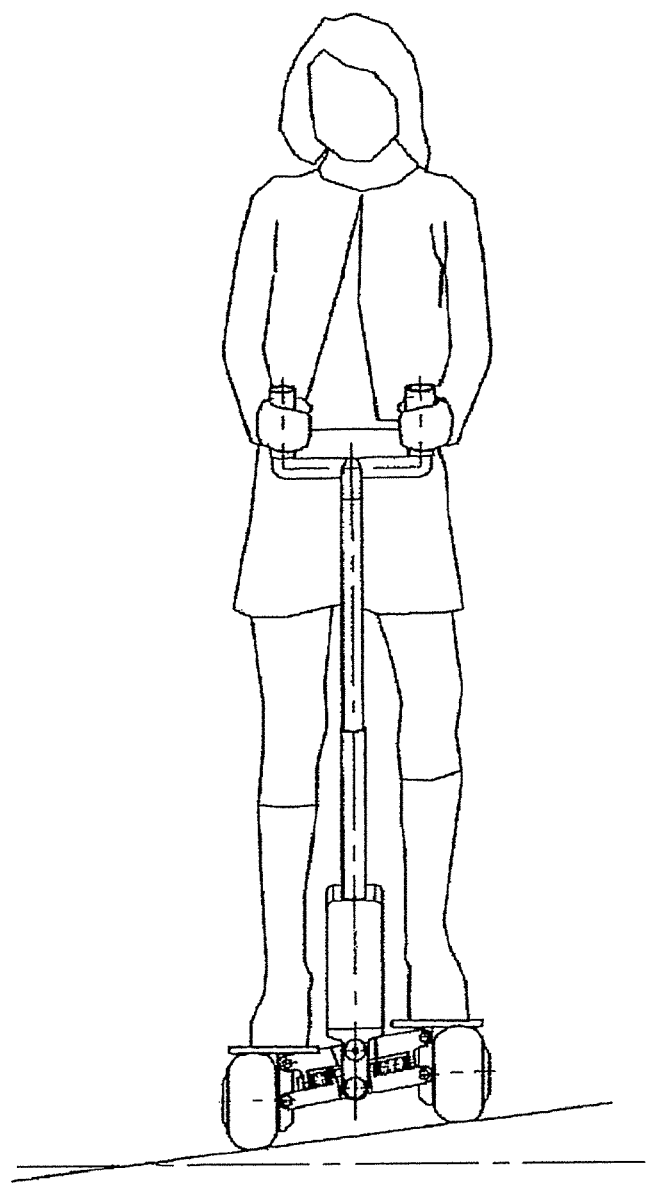
FIG. 4B is a view to describe the operation of a coaxial two-wheel vehicle of one embodiment.
Figure 4C:
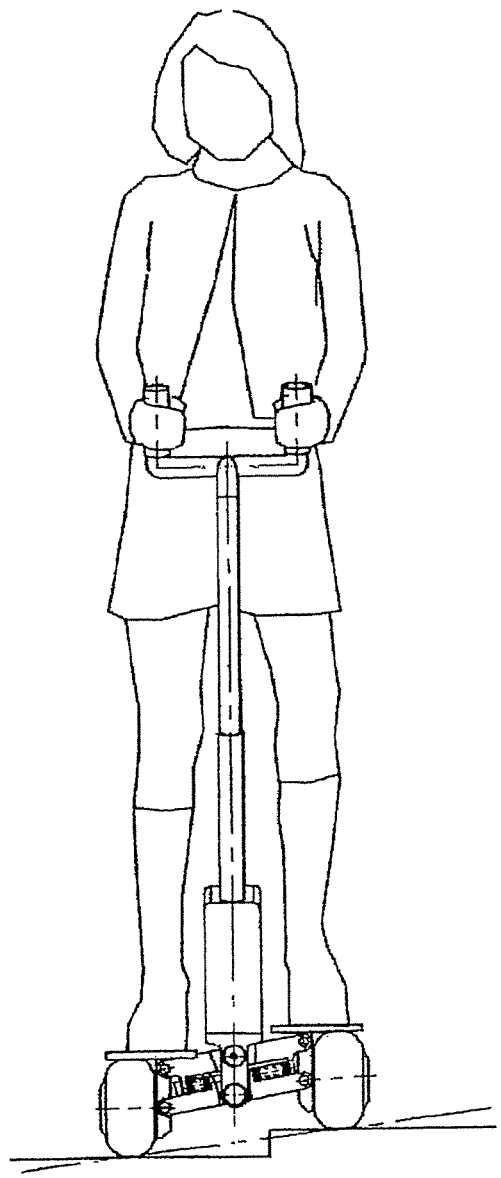
FIG. 4C is a view to describe the operation of a coaxial two-wheel vehicle of one embodiment.

In this manner, in the vehicle having the structure as shown in FIG. 1, the handle 5 and the steps 4L and 4R tilt in conjunction with each other, and the tilt angle of the handle 5 is used for a rotation control. It is thereby possible to maintain the handle 5 in the vertical position during normal traveling and easily control the motion such as a rotation by manipulating the handle 5 from that state not only on a flat road as shown in FIG. 4A but also on a lateral slope as shown in FIG. 4B and on a step portion as shown in FIG. 4C.

Figure 5A:
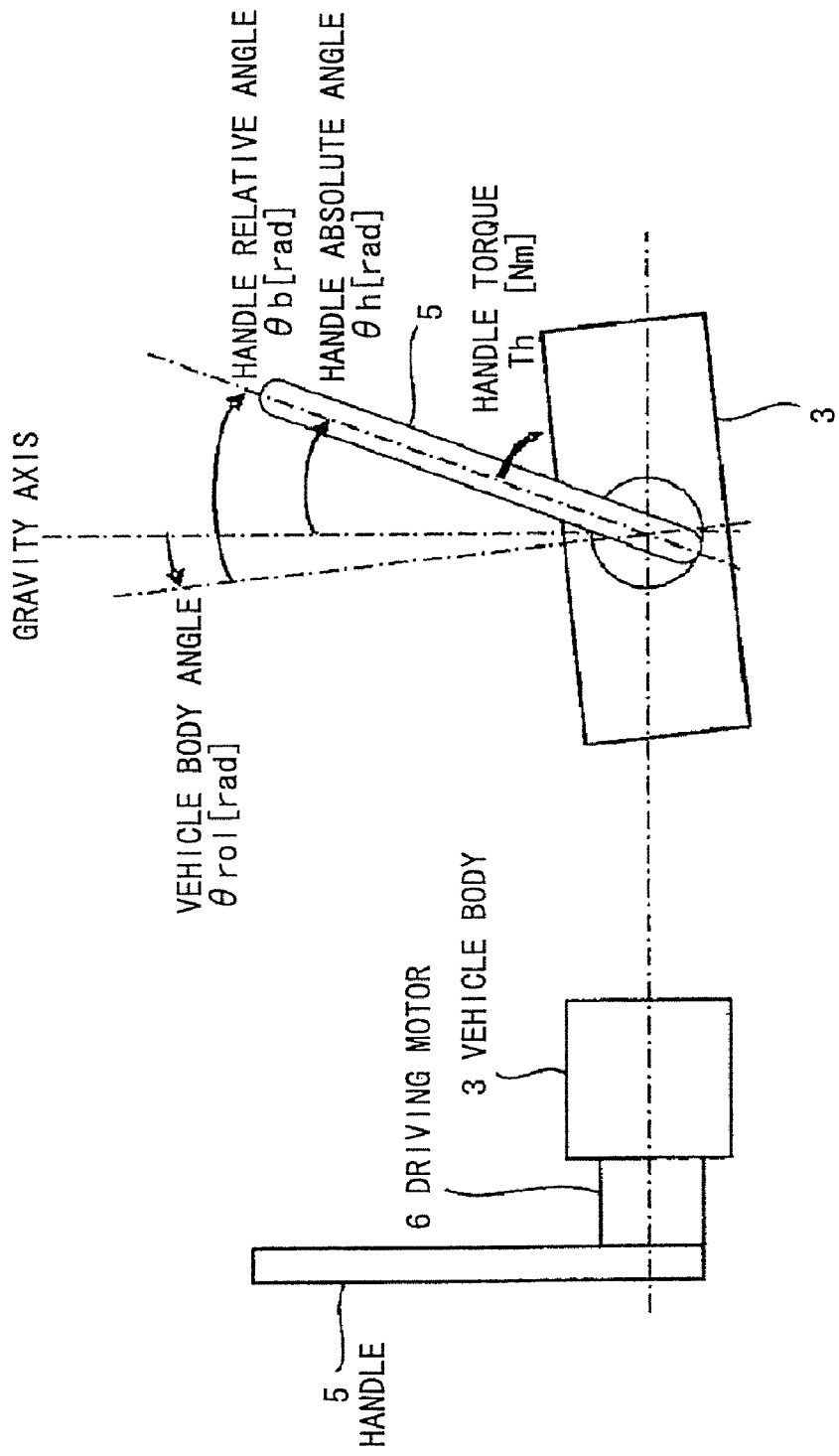
FIG. 5A is a view to describe an active handle control device.

FIG. 5A shows the overview of the above-described handle control device. Referring to FIG. 5A, the driving motor 6 that accompanies the rotation angle detector 94H is coupled to the vehicle body 3. An output axis of the driving motor 6 is coupled to the handle 5 so as to change a roll tilt angle of the handle 5. The relative angle $\theta b$ of the handle 5 to the vehicle body 3 is measured by the rotation angle detector 94H of the motor 6. A control for maintaining the handle 5 vertically to the ground with the use of the driving motor 6 according to the present invention is referred to as an "active handle control".

Figure 5B:
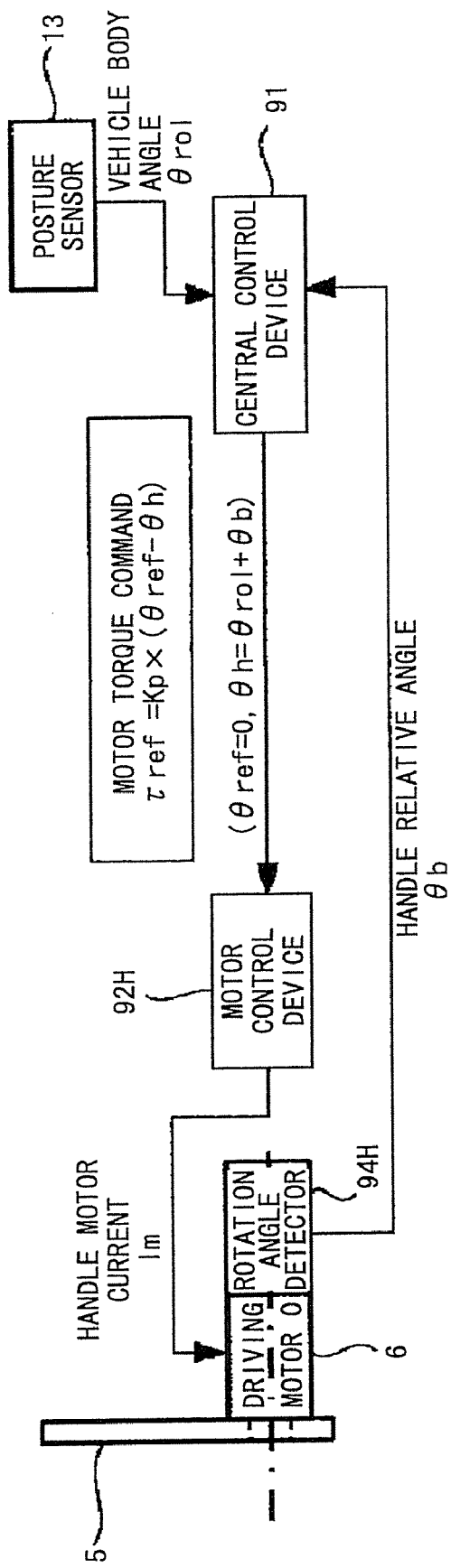
FIG. 5B is a diagram to describe an active handle control device.

FIG. 5B shows a control system configuration of the active handle control device. Referring to FIG. 5B, the central control device 91 calculates an absolute angle $\theta h$ of the handle 5 in the roll axis direction with respect to the axis vertical to the ground plane from a roll axis tilt angle $\theta rol$ of the vehicle body 3 that is obtained from the posture sensor 13 and a relative angle $\theta b$ of the handle 5 to the vehicle body 3 that is measured by the rotation angle detector 94H of the driving motor 6. The central control device 91 then supplies to the motor control unit 92H a torque command for controlling the driving motor 6 so as to bring the absolute angle $\theta h$ to zero or to bring the handle 5 to be vertical to the horizontal plane. The absolute angle $\theta h$ indicates an amount of a shift operation (which is an angle in this example) from a neutral position (gravity axis). The encoder 94H is an example of a measurement unit for measuring a shift operation.

As a result, the neutral position of the handle 5 is always in the position vertical to the horizontal plane regardless of a tilt $\theta rol$ of the vehicle body in the roll axis direction.

Therefore, when the lateral inclination of a road changes from zero to a certain angle, such as from FIG. 4A to 4B or from FIG. 4A to 4C, as the vehicle travels, for example, the handle and the step automatically change to their postures vertical to the horizontal plane by a motor torque without the need for a passenger to exert power to the handle. This allows a passenger to proceed straight while maintaining a stable standing posture without tilting the body to the left or right.

Further, when performing a rotation operation, a virtual spring force corresponding to a position control gain [Kp] and an angle deviation $[-\theta h]$ shown in FIG. 5B which is produced by a motor torque is applied to the handle. Accordingly, a passenger can implement a desired rotation operation by manipulating the handle toward a given direction against the virtual spring force. Manipulation of the handle against the virtual spring force means that a passenger carries out the manipulation with an intention, thereby reducing the risk that the vehicle behaves in a manner unintended by a passenger.

Specifically, according to the travel device of the present invention, with the use of the system shown in FIGS. 5A and 5B, the neutral position of the handle does not vary with a tilt angle of a road, thereby enabling the easy and stable straightforward traveling even on a laterally inclined road. In addition, when performing a rotation operation such as rotation on the spot on an inclined road by manipulating a rotation lever or handle, a passenger can make a rotation while maintaining the body in the vertical position, thereby significantly improving the stability when the vehicle is moving.

Figure 6:
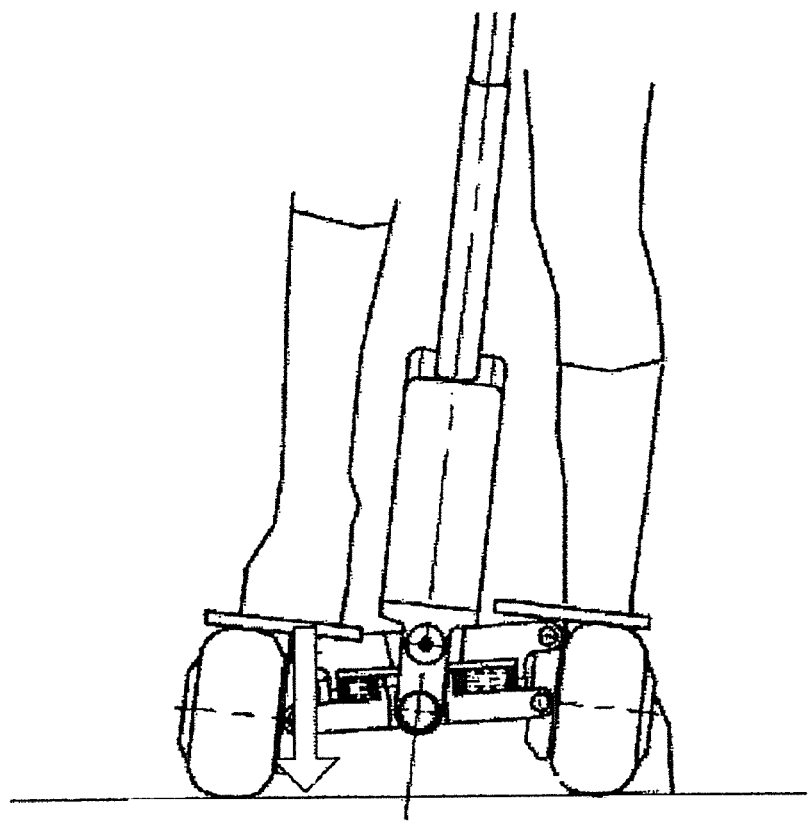
FIG. 6 is a view to describe an active handle control device.
Figure 7:
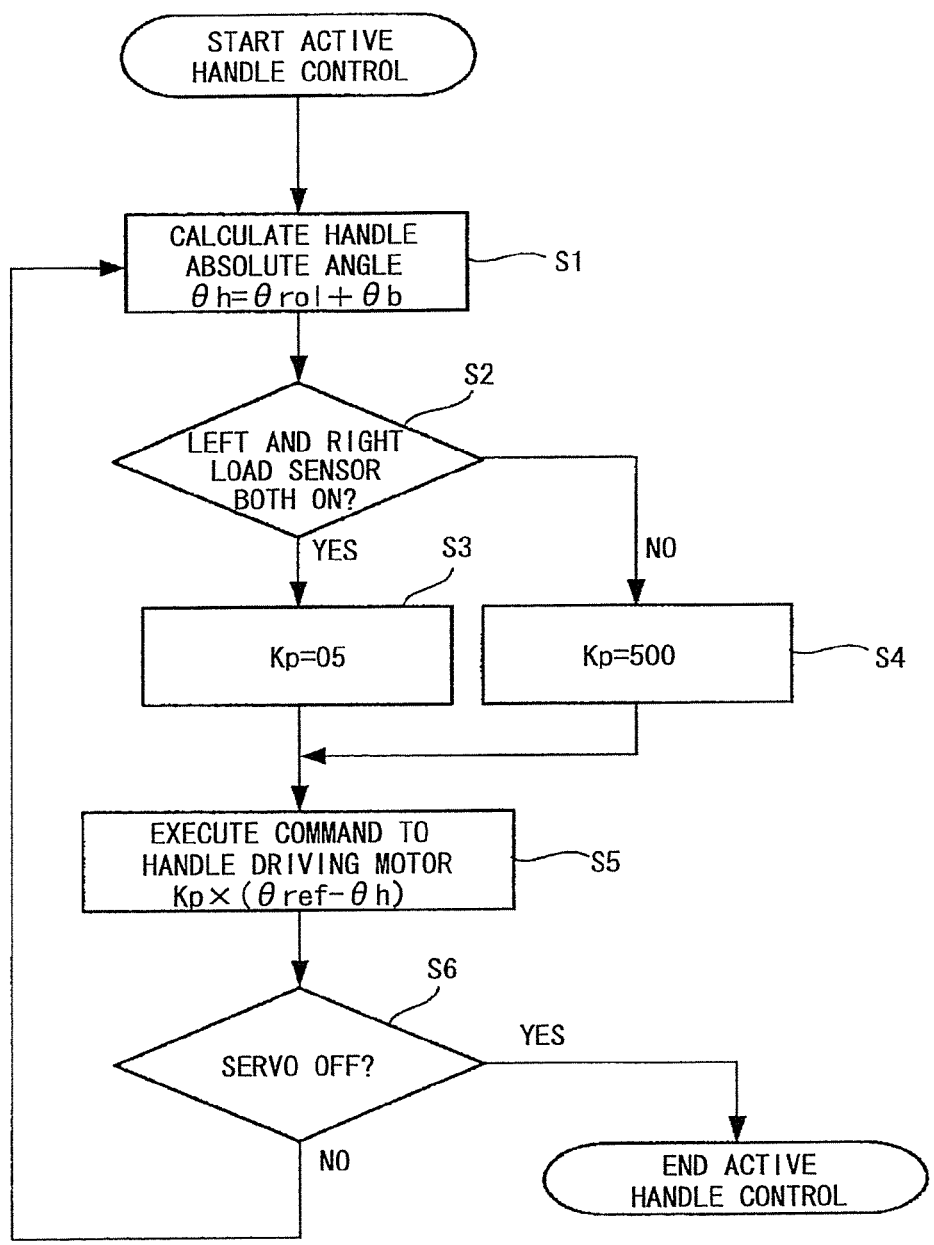
FIG. 7 is a flowchart to describe an active handle control device.

The position control gain [Kp] shown in FIG. 5B described above corresponds to a spring constant of the virtual spring force. Thus, a degree of flexibility of the handle can be controlled by changing the amount of the gain. It is thereby possible to prevent the vehicle from tilting during loading or unloading of a passenger as shown in FIG. 6 with the use of a load sensor or the like that is placed on the step, thereby permitting a passenger to get on or off the vehicle smoothly. FIG. 7 shows a flowchart of a control for preventing a vehicle body from tilting during loading or unloading of a passenger, which is performed for implementing such processing.

Referring to FIG. 7, after the start of the active handle control, the Step S1 calculates a handle absolute angle ($\theta h = \theta rol + \theta b$). The step S2 then determines whether the left and right load sensors are both ON or not. If both of the load sensors are ON. (Yes), the Step S3 sets the position control gain [Kp] to a small value, such as Kp=5. On the other hand, if the both of the load sensors are OFF or either one is ON (No), the Step S4 sets the position control gain [Kp] to a large value, such as Kp=500.

Then, the Step S5 executes a command ($\tau ref = Kp \times (\theta d - \theta h)$) to the handle driving motor. The position control gain [Kp] is thereby set to Kp=5 or Kp=500. Further, the Step S6 determines whether the servo is turned OFF or not. If the servo is turned OFF (Yes), the active handle control ends. If, on the other hand, the servo is not turned OFF (No), the process returns to the Step S1 and repeats the operation again. The process of the control for preventing a vehicle body from tilting during loading or unloading of a passenger is thereby implemented.

Thus, the travel device of the present invention determines that a passenger is getting on or off the vehicle when load sensor outputs are not both ON, and sets the position control gain [Kp] to a large value. This makes the handle and the step less likely to rotate about the vehicle body compared with the case where the gain is smaller when the same level of an external force is applied to the step or the handle. It is thereby possible to reduce the tilt of the step and the handle due to an unbalanced load between the left and the right during loading or unloading of a passenger as shown in FIG. 6. The vehicle device of FIG. 1 supports the handle 5 with the use of springs 10L and 10R so as to maintain the handle 5 in the vertical position during power-OFF also. Although such a structure is used in an existing device as well, a spring constant of the springs 10L and 10R is fixed. Therefore, a power required for the handle to tilt in the roll axis direction is the same regardless of a weight or muscle strength of a passenger. This causes a passenger with less physical strength, particularly, to be physically exhausted to perform a desired manipulation.

On the other hand, the travel device of the present invention changes the rigidity of the handle in the roll axis direction according to the characteristics of a passenger, thereby providing manipulability suitable for each passenger. Specifically, it may detect a weight of a passenger by a load sensor and change the amount of the position control gain [Kp] according to the detected value. It is thereby possible to reduce the amount of the position control gain [Kp] for a passenger who has a small weight and is thus likely to have low power so as to permit the handle to tilt with less power.

Figure 8A:
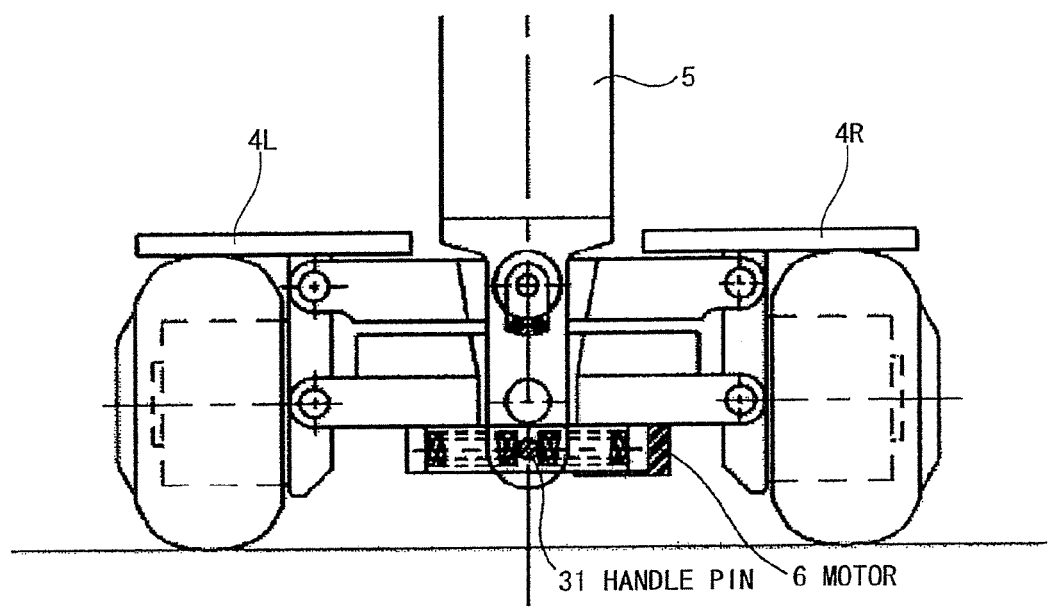
FIG. 8A is a structure diagram (front view) of a substantial part of a coaxial two-wheel travel vehicle.
Figure 8B:
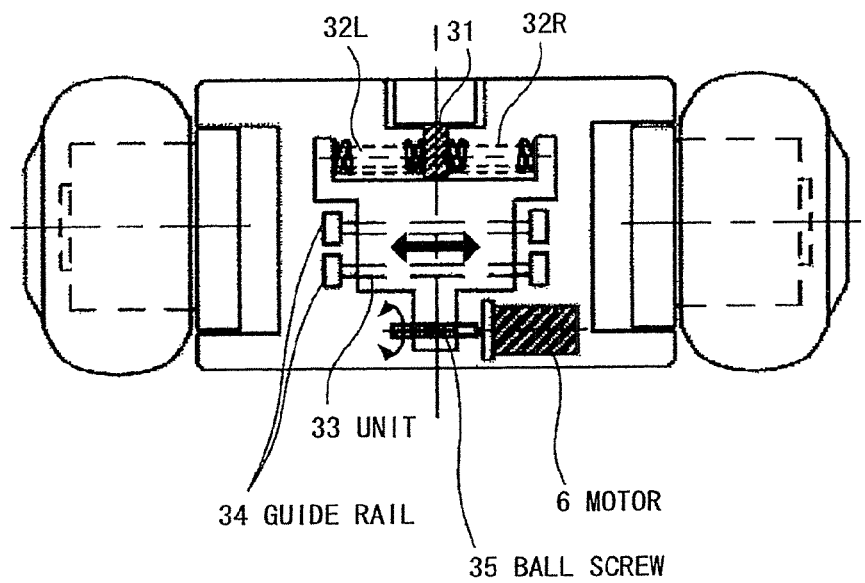
FIG. 8B is a structure diagram (bottom view) of a substantial part of a coaxial two-wheel travel vehicle.
Figure 9A:
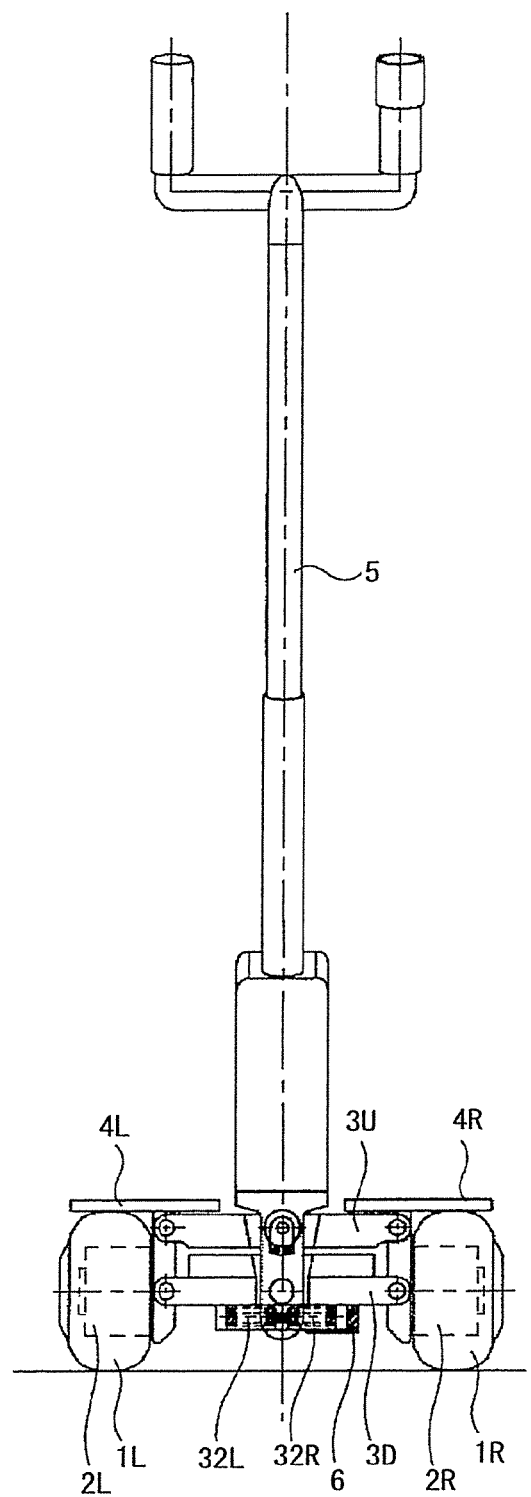
FIG. 9A is a view to describe a coaxial two-wheel travel vehicle shown in FIGS. 8A and 8B.
Figure 9B:
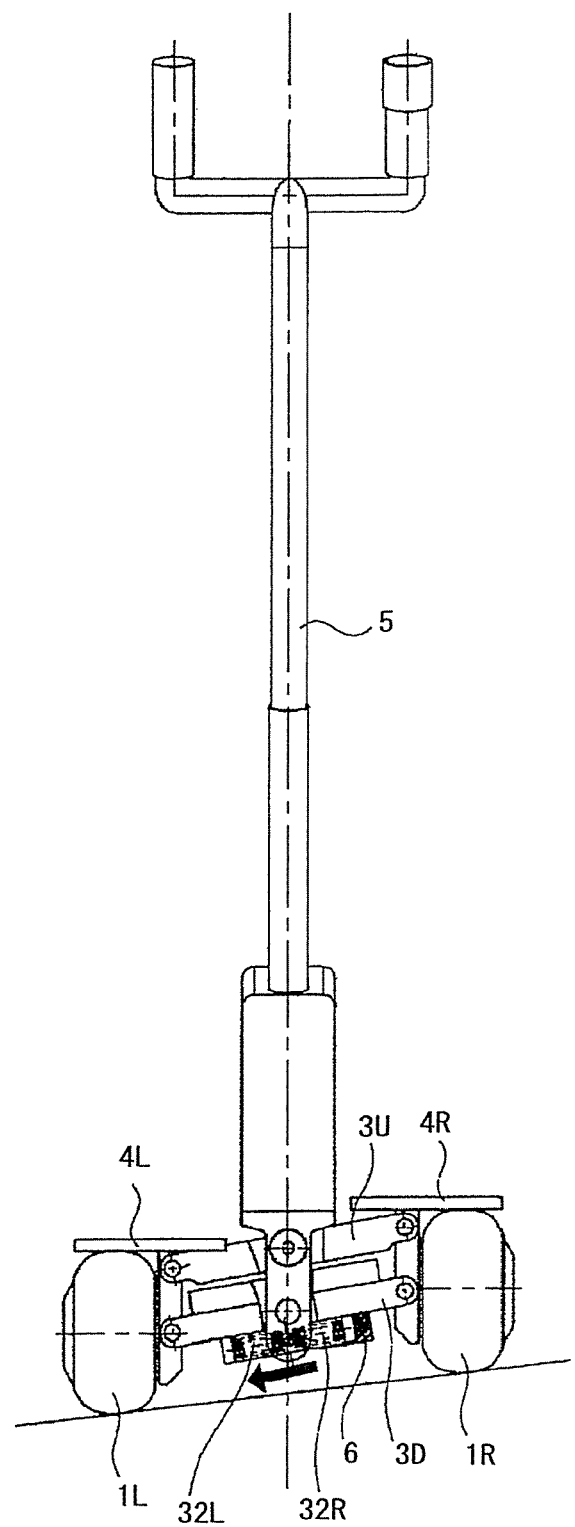
FIG. 9B is a view to describe a coaxial two-wheel travel vehicle shown in FIGS. 8A and 8B.

If the springs 10L and 10R are not mounted to the vehicle shown in FIGS. 1A and 1B, it is necessary to generate a restoring force constantly by a motor torque for a handle manipulation upon rotation on a flat road as well. On the other hand, if the springs 10L and 10R are used in combination in the vehicle shown in FIGS. 1A and 1B, it is necessary to control the motor against a spring force. There is thus a problem of large battery consumption in both cases. FIGS. 8A and 8B show the structure of an embodiment that constrains the handle to a given neutral position with a combined use of a motor and a mechanical spring. FIGS. 9A and 9B are views to describe a coaxial two-wheel vehicle using the structure of FIGS. 8A and 8B. FIG. 9A illustrates traveling on a flat ground, and FIG. 9B illustrates traveling on a lateral slope.

Referring to the front view of FIG. 8A, springs 32L and 32R are mounted to the left and right of a handle pin 31 that is placed at the lower end of the handle 5. Referring to the bottom view of FIG. 8B, the springs 32L and 32R are mounted to a unit 33, which is mounted to be movable to the left and right by a guide rail 34. The driving motor 6 is mounted to the unit 33 through a ball screw 35. If the driving motor 6 rotates reversely, the unit 33 moves to the left and right through the ball screw 35.

In such a structure, the steps 4L and 4R are linked to the handle 5. A restoring force to the manipulation of the handle 5 during a rotation is generated by the springs 32L and 32R that are placed on the left and right of the handle pin 31. Although a lateral force is applied to the spring unit 33 of which moving direction is constrained by the guide rail 34, there is no need to apply a torque to the driving motor 6 because the left and right position of the spring unit 33 is fixed by the ball screw 35 which is incapable of back-driving.

On the other hand, application of a torque to the driving motor 6 for driving allows the spring unit 33 to be displaced left and right, thus controlling the neutral position (the handle position where the sum of left and right spring forces is zero) of the handle pin 31. Therefore, if the driving motor 6 is driven so that the neutral position of the handle is vertical to the horizontal plane when the lateral inclination of a road changes as shown in FIGS. 4A, 4B and 4C, the step is kept horizontal when a passenger does not intentionally apply any control force to the handle and the step, thereby permitting a passenger to travel stably.

As described above, the vehicle structure of the embodiment shown in FIG. 8 drives the driving motor 6 only when changing the neutral position of the handle on a laterally inclined road or the like. This reduces power consumption in the driving motor 6 and thereby reduces battery consumption compared with the embodiment shown in FIG. 1. Further, because the driving motor 6 deaccelerates by the ball screw 35, a large translational force can be obtained even with a use of a small motor.

Further, the behavior of the handle can be improved by adding an integrodifferential term to a control law of a handle driving motor that is implemented in Step S5 of FIG. 7, which is:

$$\tau \text{ref} = K_p \times (\theta \text{ref} - \theta h) \quad (1.1)$$

to produce the following expression:

$$\tau \text{ref} = K_p \times (\theta \text{ref} - \theta h) + K_d \times d/dt(\theta \text{ref} - \theta h) + K_i \times \int (\theta \text{ref} - \theta h) dt \quad (1.2)$$

Specifically, if a passenger releases the handle after tilting the handle to make a rotation, for example, in an existing vehicle, the handle returns abruptly by the spring force and swings in the vicinity of the neutral position, which causes the vehicle to rotate to the left or right and behave unstably. On the other hand, if the active handle control that is represented by the expression that includes the second term (integrodifferential term) on the right side of the expression (1.2) in a vehicle with the device of the present invention, the handle returns to the neutral position (vertical position) slowly by the function of the above integrodifferential term, so that the vehicle behaves stably.

Further, although the handle cannot return to the original vertical position once it tilts due to its own weight during the control represented by the expression (1.1), adding the integral term in the third term of the expression (1.2) enables canceling of the effect of the self weight to allow the handle to return to the vertical position. In this manner, the travel device of the present invention achieves stable and suitable traveling by implementing the active handle control.

Furthermore, an existing coaxial two-wheel vehicle cannot generate a high rotation speed during autonomous travel with a passenger on board because the passenger receives an outward force by a centrifugal force upon rotation. On the other hand, the travel device of the present invention can tilt the handle or the step of the vehicle according to a rotation operation during autonomous travel by the active handle control. This allows the center of gravity of a passenger to shift inward, thereby improving the stability of the vehicle.

Figure 10A:
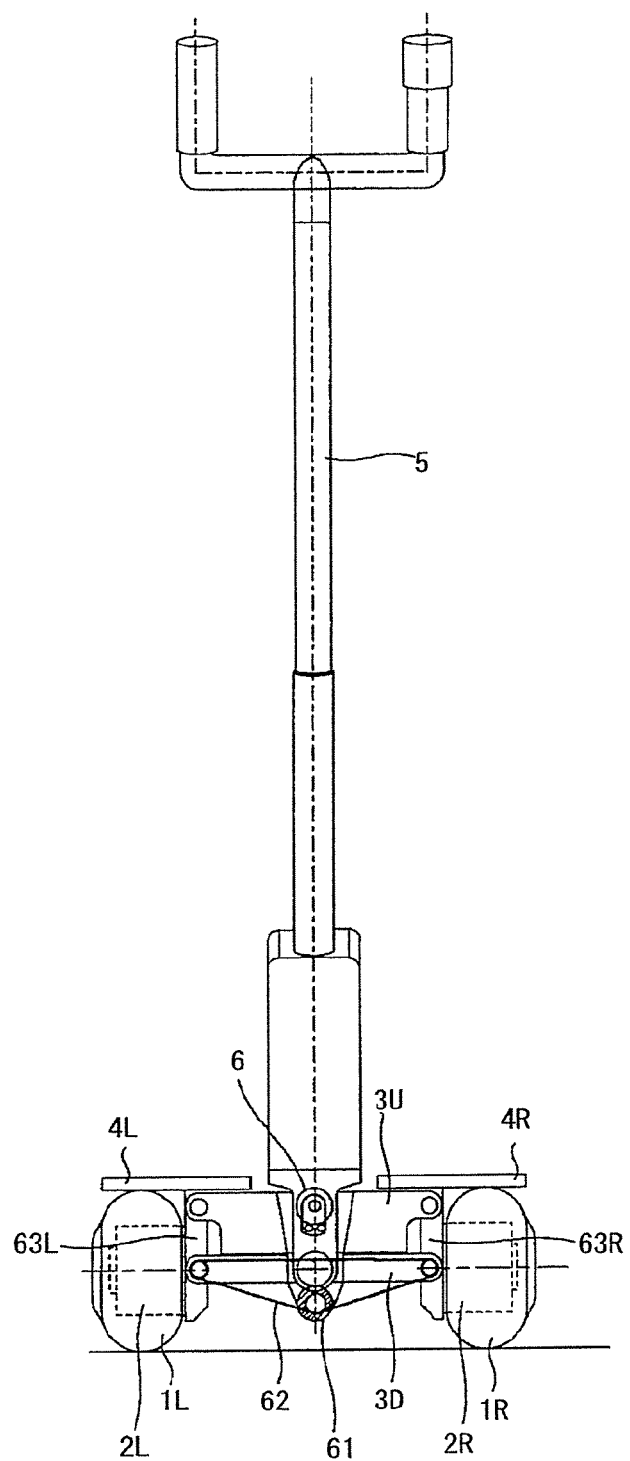
FIG. 10A is a front view showing the structure of a coaxial two-wheel vehicle of another embodiment to which a travel device of the present invention is applied.
Figure 10B:
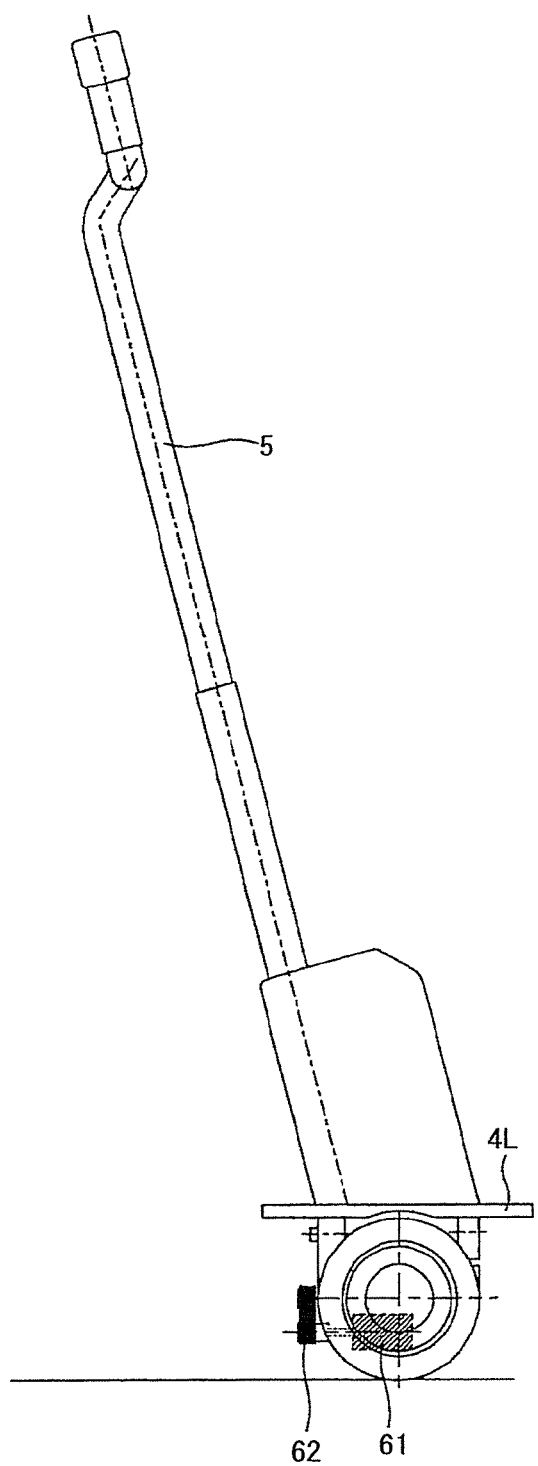
FIG. 10B is a side view showing the structure of a coaxial two-wheel vehicle of another embodiment to which a travel device of the present invention is applied.

FIG. 10A and subsequent drawings show other embodiments of the travel device according to the present invention. FIGS. 10A and 10B show an embodiment that implements an "active step control" in which the active control is carried out mainly on the steps 4L and 4R, which is different from the embodiment of FIGS. 1A to 9B in which the active control is carried out mainly on the handle 5 and the control through the link mechanism is carried out on the steps 4L and 4R.

A coaxial two-wheel vehicle shown in FIGS. 10A and 10B includes a step driving motor 61 that is mounted to the inferior part of the vehicle body 3U. The step driving motor 61 operates to rotate, through a belt 6, vertical members 63L and 63R that are coupled to the left and right steps 4L and 4R relative to the vehicle body 3U. The steps 4L and 4R thereby rotate relative to the vehicle body 3U, thus implementing the active driving of the steps 4L and 4R. The handle 5 is controlled through the link mechanism as the steps 4L and 4R are driven. The step driving motor 61 is an example of a tilt driving unit for driving the tilt of the steps 4L and 4R in the roll axis direction.

FIGS. 11A to 14B show embodiments in which the handle 5 and the step 4 are shifted independently of each other. Such embodiments also implements the active control on the handle 5 and the step 4, so that a passenger can maintain his/her posture vertical to the horizontal plane without applying any control force to the handle in spite of a slope of a road, thus achieving the desired effect.

Figure 11A:
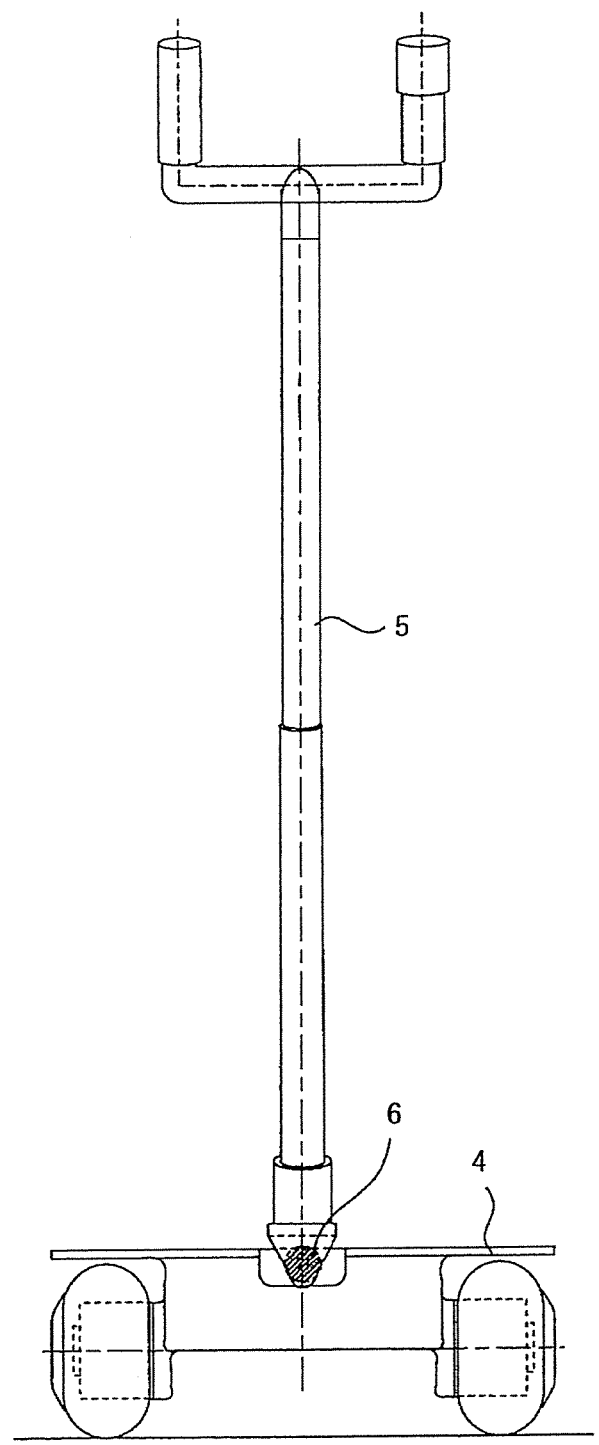
FIG. 11A is a front view showing the structure of a coaxial two-wheel vehicle of another embodiment to which a travel device of the present invention is applied.
Figure 11B:
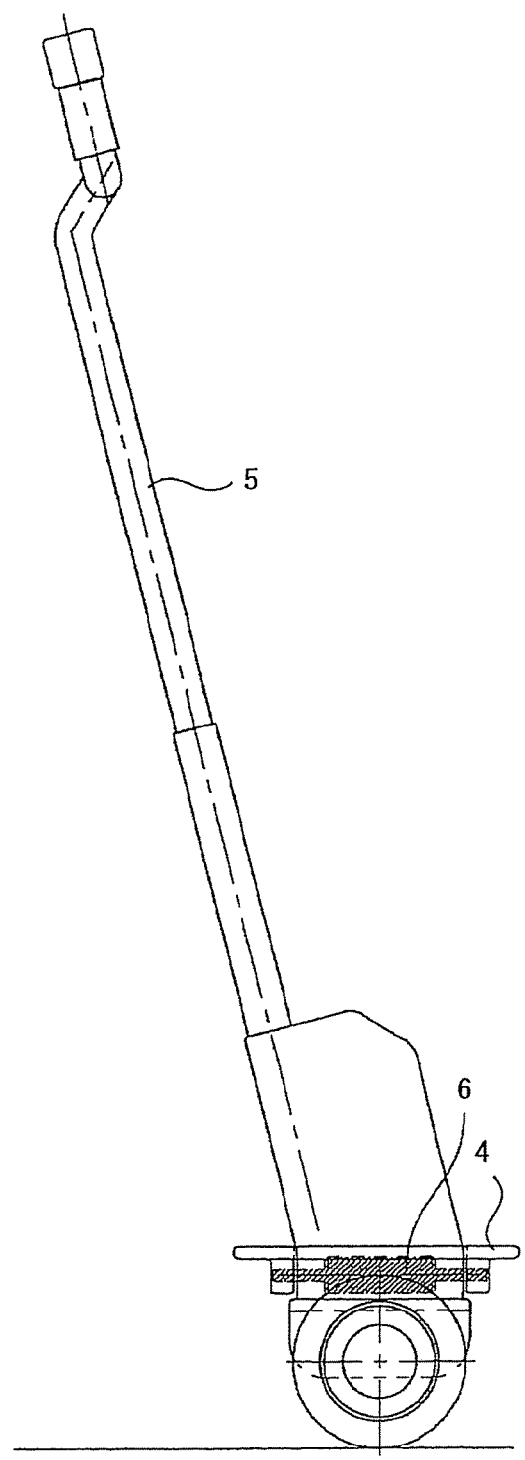
FIG. 11B is a side view showing the structure of a coaxial two-wheel vehicle of another embodiment to which a travel device of the present invention is applied.
Figure 12A:
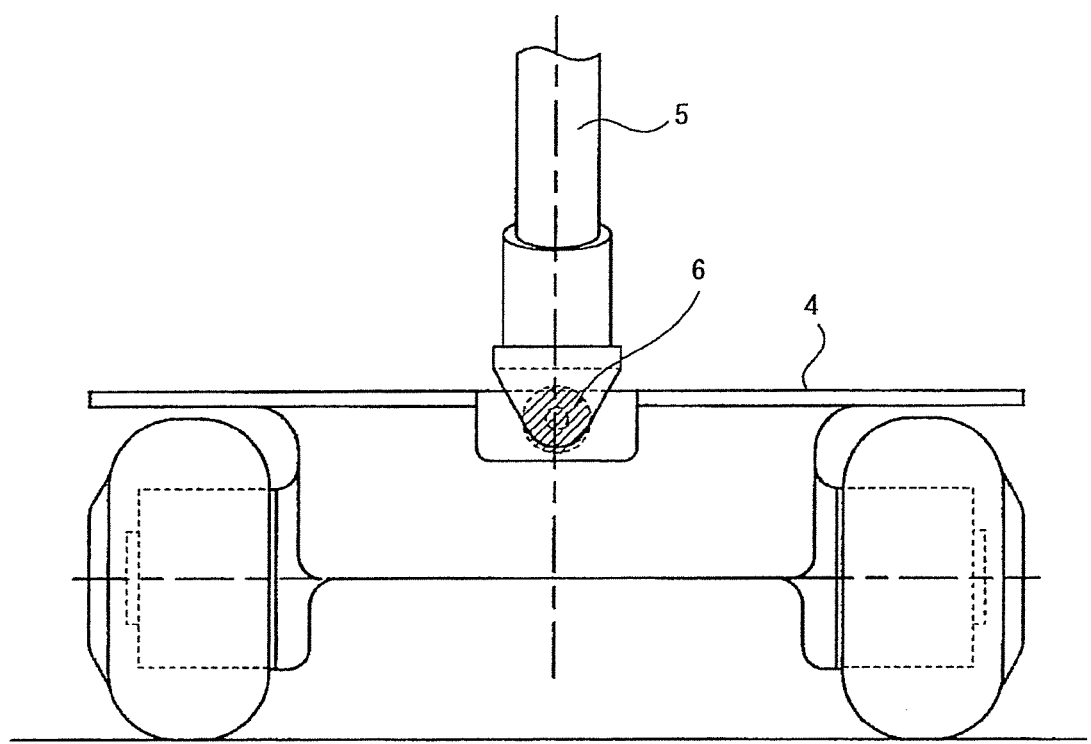
FIG. 12A is a view to describe a coaxial two-wheel vehicle of another embodiment.
Figure 12B:
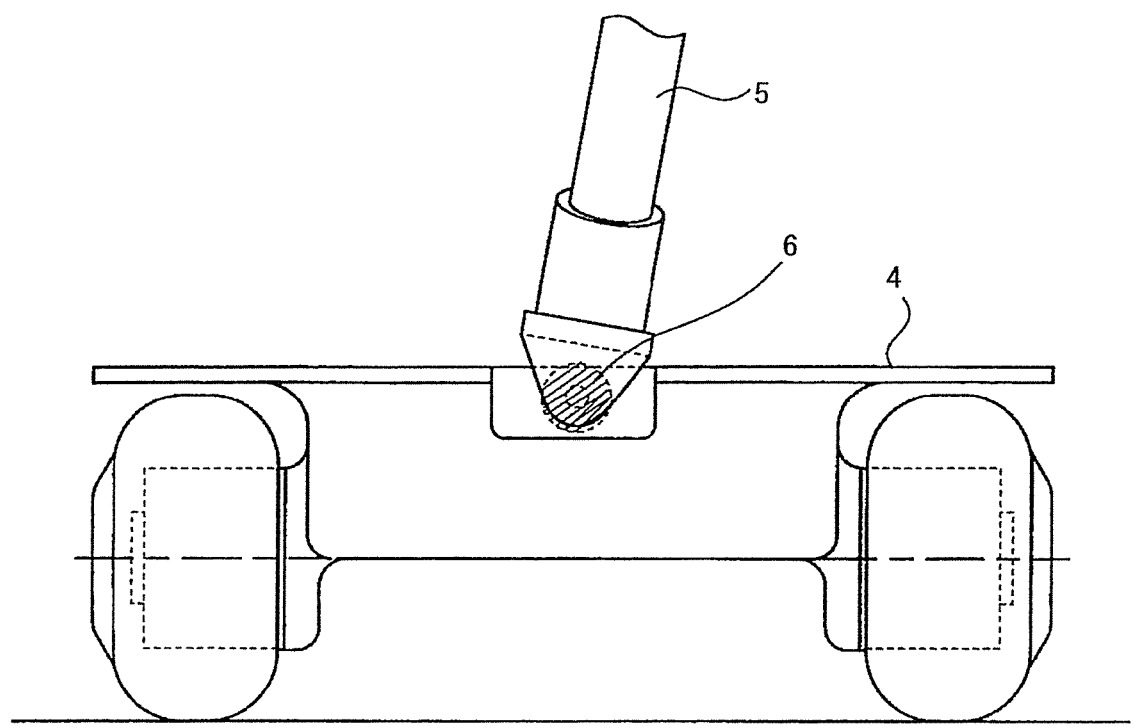
FIG. 12B is a view to describe a coaxial two-wheel vehicle of another embodiment.

A coaxial two-wheel vehicle shown in FIGS. 11A and 11B is configured to make a control of the handle 5. Specifically, this embodiment drives the handle 5 by the driving motor 6 that is mounted to the step 4. Thus, the handle 5 can be controlled at a given angle with respect to the step 4 by driving the driving motor 6 as shown in FIGS. 12A and 12B. A passenger can thereby maintain his/her posture vertical to the horizontal plane without applying any control force to the handle even when there is a slope of a road, thus achieving a natural rotation and forward motion. In FIGS. 11A and 11B, the driving motor 6 is an example of a tilt driving unit for driving the handle 5 to tilt in the roll axis direction.

Figure 13A:
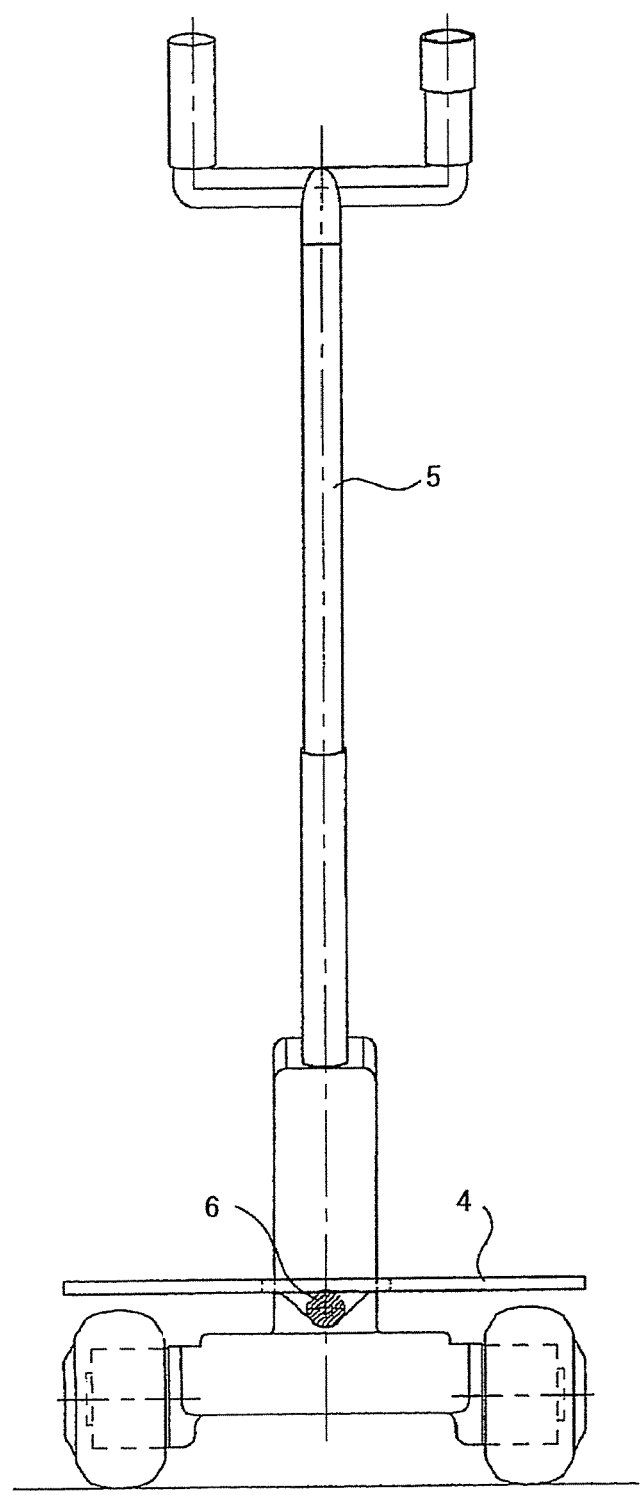
FIG. 13A is a front view showing the structure of a coaxial two-wheel vehicle of yet another embodiment to which a travel device of the present invention is applied.
Figure 13B:
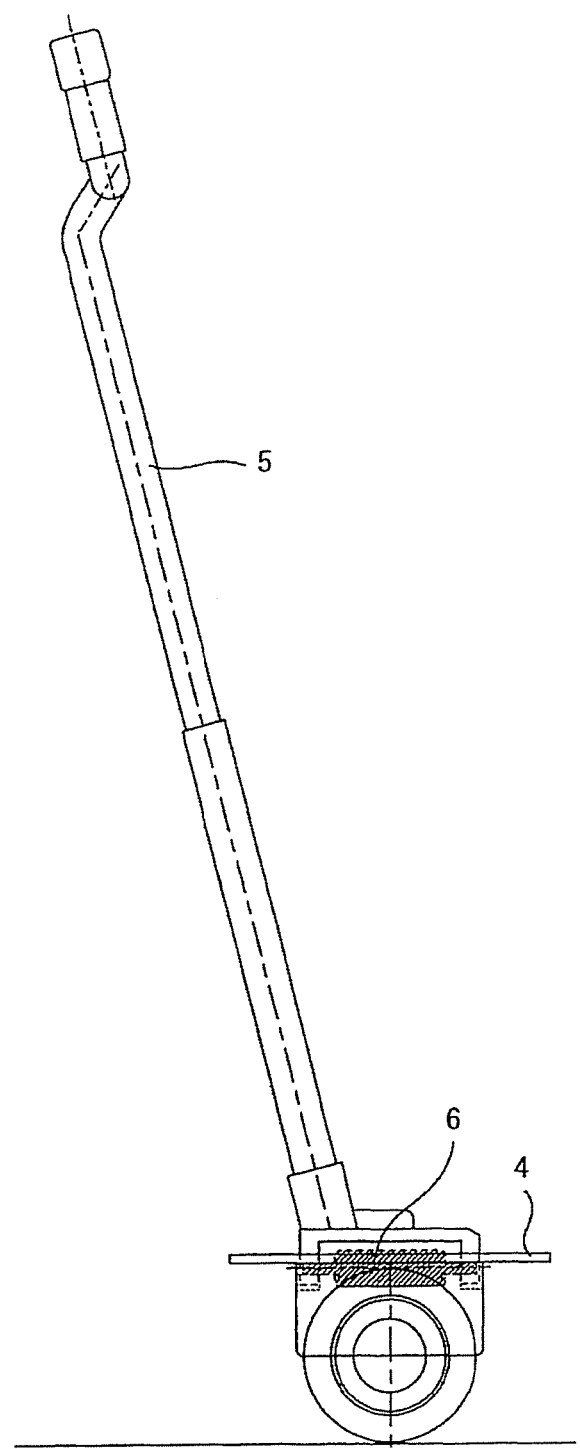
FIG. 13B is a side view showing the structure of a coaxial two-wheel vehicle of yet another embodiment to which a travel device of the present invention is applied.
Figure 14A:
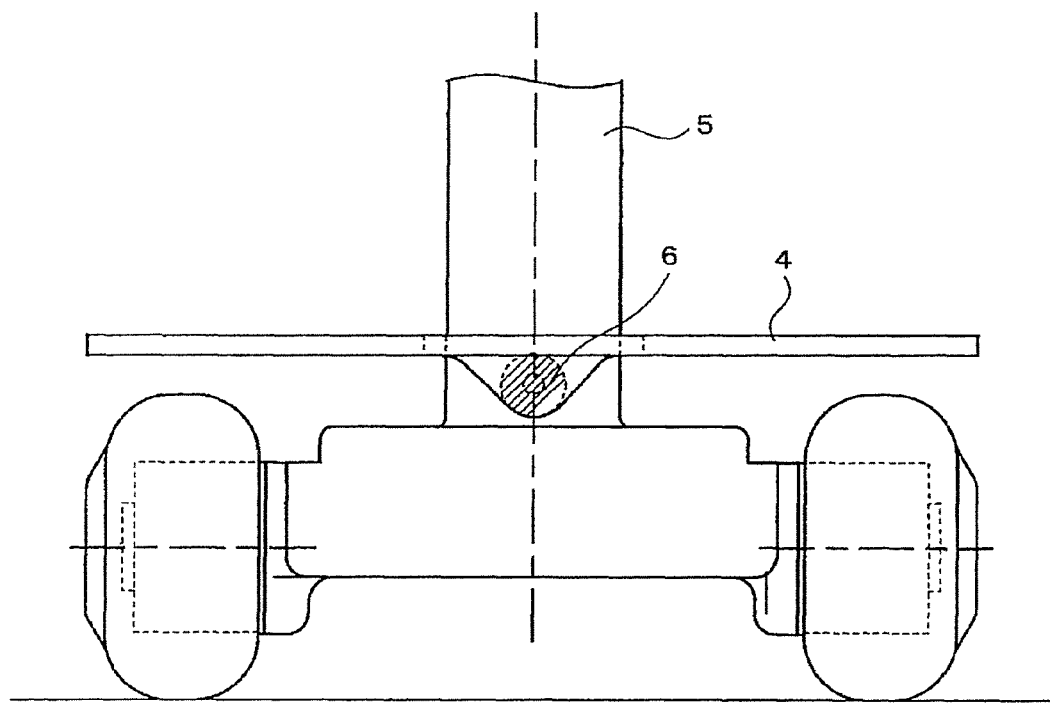
FIG. 14A is a view to describe a coaxial two-wheel vehicle of yet another embodiment.
Figure 14B:
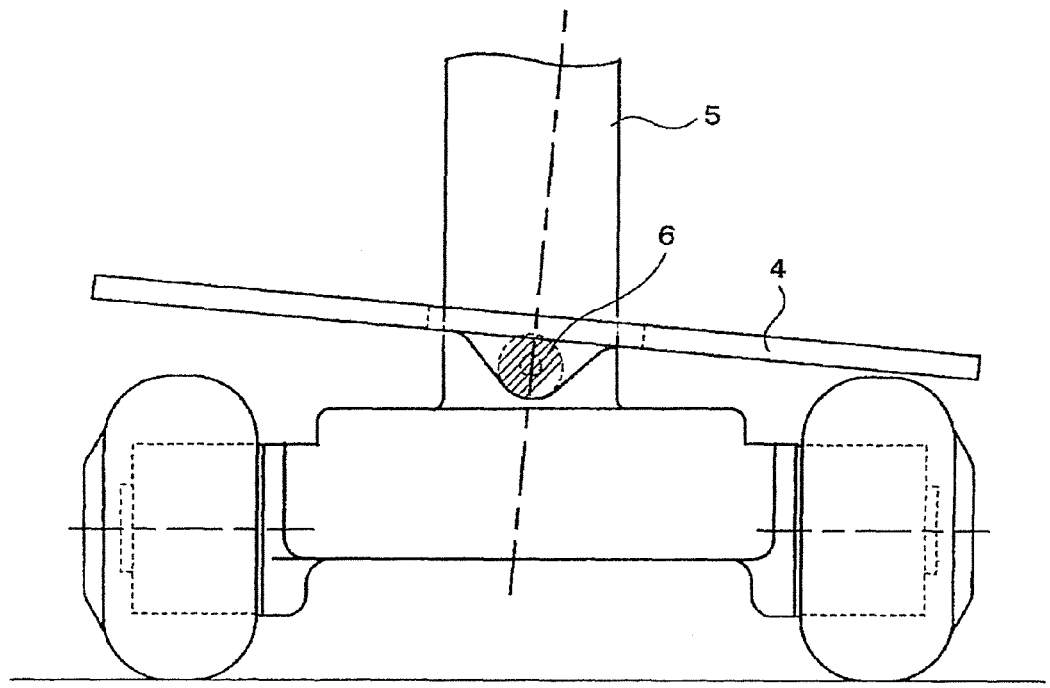
FIG. 14B is a view to describe a coaxial two-wheel vehicle of yet another embodiment.
Figure 15A:
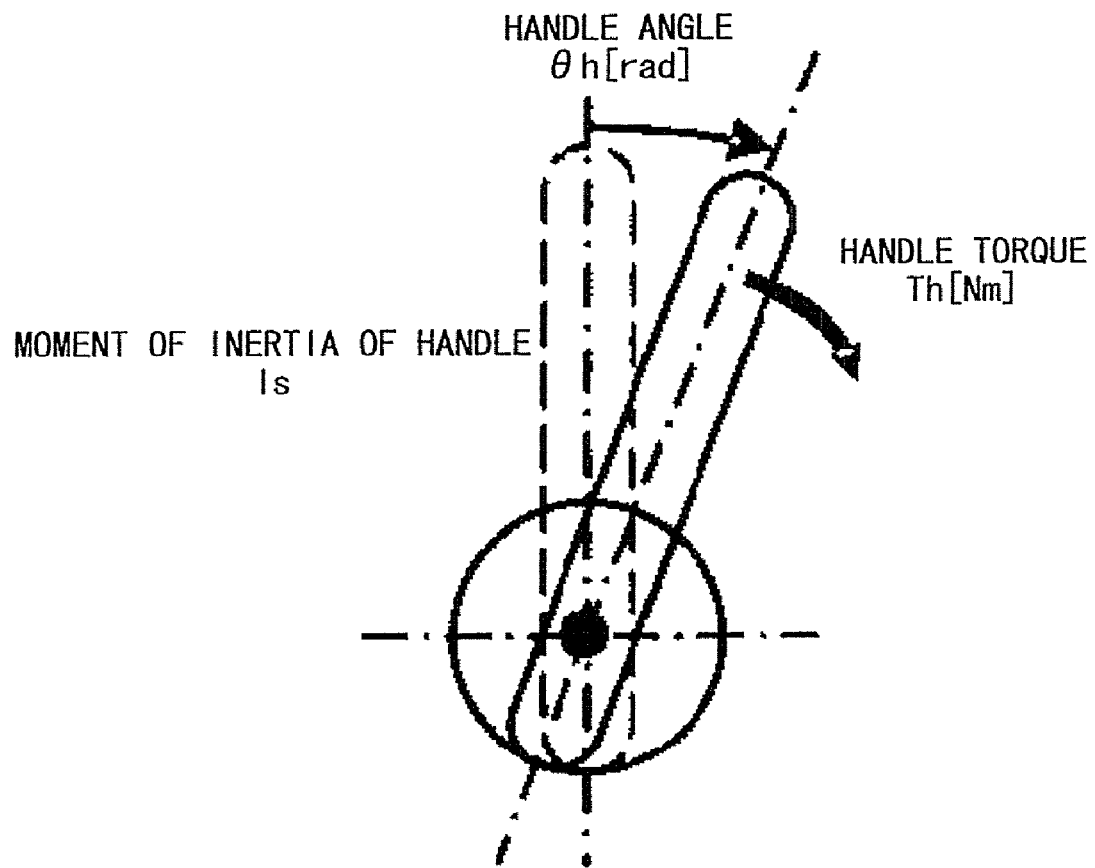
FIG. 15A is a view to describe the moment of inertia of a handle.
Figure 15B:
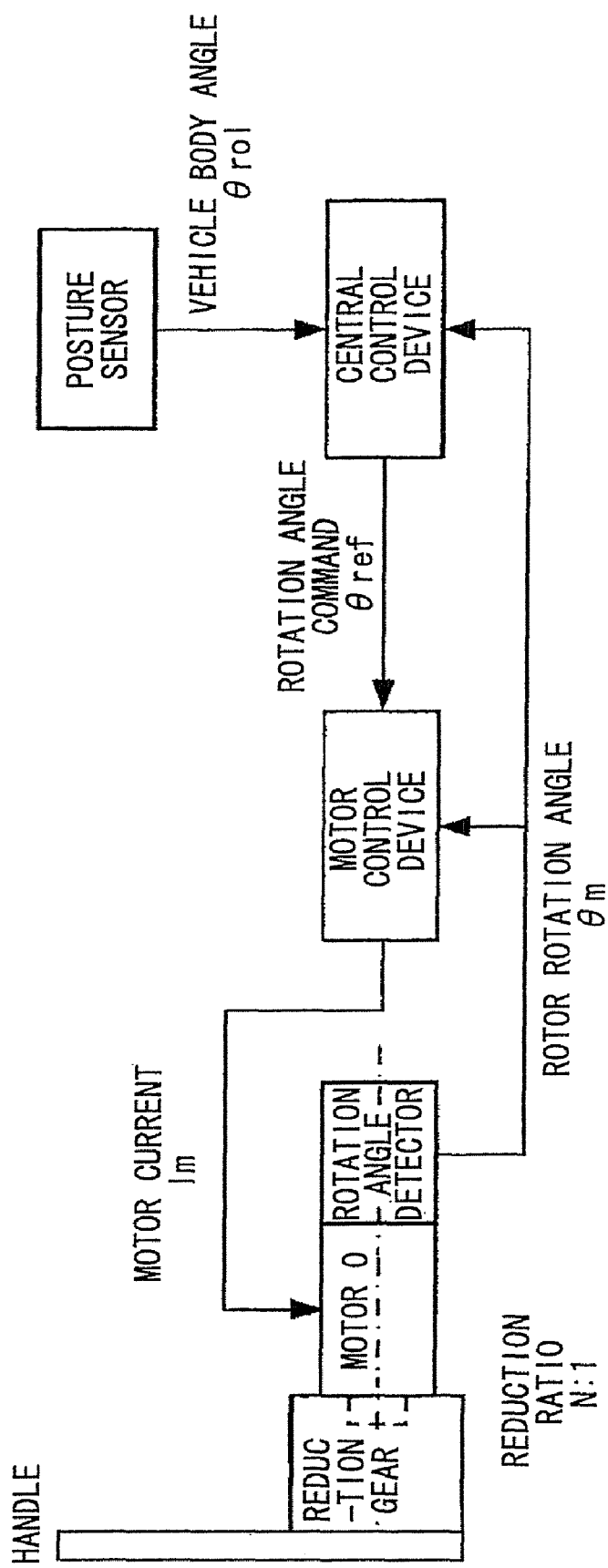
FIG. 15B is a structure diagram of an active handle control system using a reduction gear.

A coaxial two-wheel vehicle shown in FIGS. 13A and 13B is configured to make a control of the step 4. Specifically, this embodiment drives the step 4 by the driving motor 6 that is mounted to the handle 5. Thus, the step 4 can be controlled at a given angle with respect to the handle 5 by driving the driving motor 6 as shown in FIGS. 14A and 14B. A passenger can thereby maintain his/her posture vertical to the horizontal plane without applying any control force to the handle even when there is a slope of a road, thus achieving a natural rotation and forward motion. In FIGS. 13A and 13B, the driving motor 6 is an example of a tilt driving unit for driving the step 4 to tilt in the roll axis direction. The moment of inertia Is of the handle when the handle is driven is as shown in FIG. 15A, for example. Signals of units in the control circuit related to the moment of inertia Is of the handle are as shown in FIG. 15B. A control model of such a handle system is as shown in FIG. 16, for example.

In such a control device, however, if a handle torque Th is exerted as an external torque, the motor control device generates a feedback torque so as to correspond to a rotation angle command, and thereby the motor generates a torque for maintaining the handle at a commanded angle. Consequently, the displacement of a handle angle is small in spite of the exertion of a handle torque. Further, if there is a reduction gear between the handle and the motor as shown in FIGS. 15A and 15B, the displacement of an angle for a handle torque is small due to the effect of friction.

In light of the foregoing, a control using the following mathematical model is required, and the use of the present invention enables provision of a control device capable of displacing a handle angle easily by an external force. Such an embodiment is described hereinafter.

Figure 16:
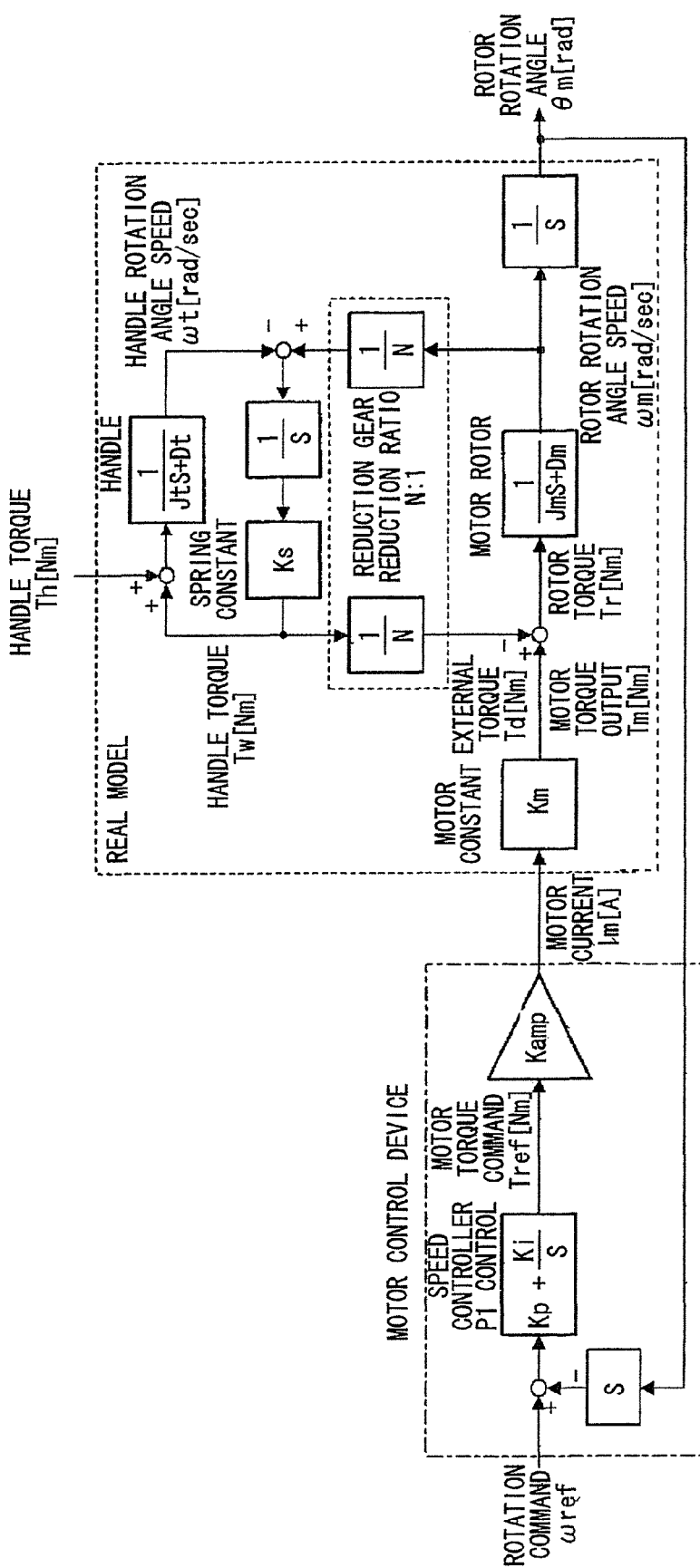
FIG. 16 is a diagram to describe a control method of an active handle control system using a reduction gear.
Figure 17A:
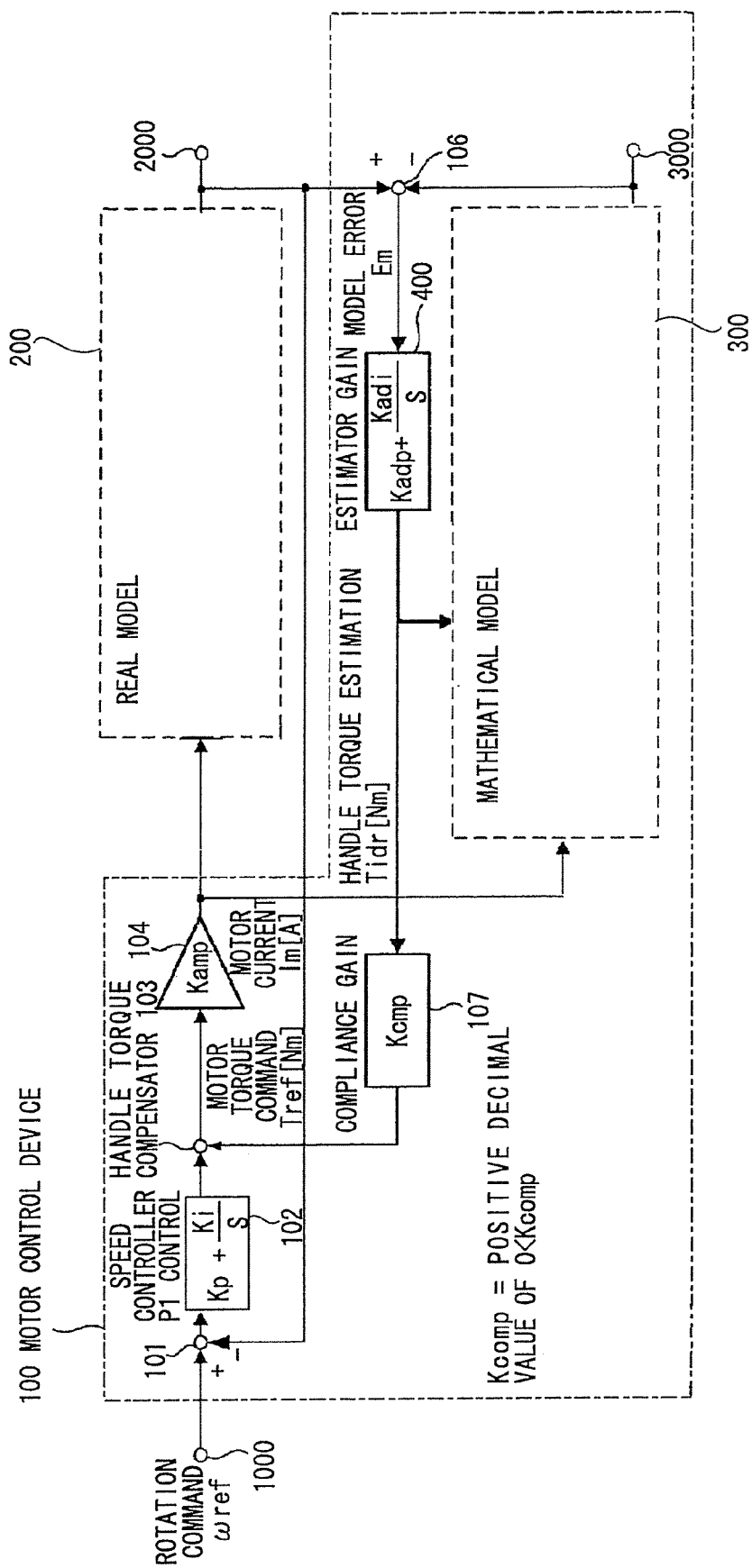
FIG. 17A is a structure diagram of a handle torque estimator and a system to implement handle compliance control.
Figure 17B:
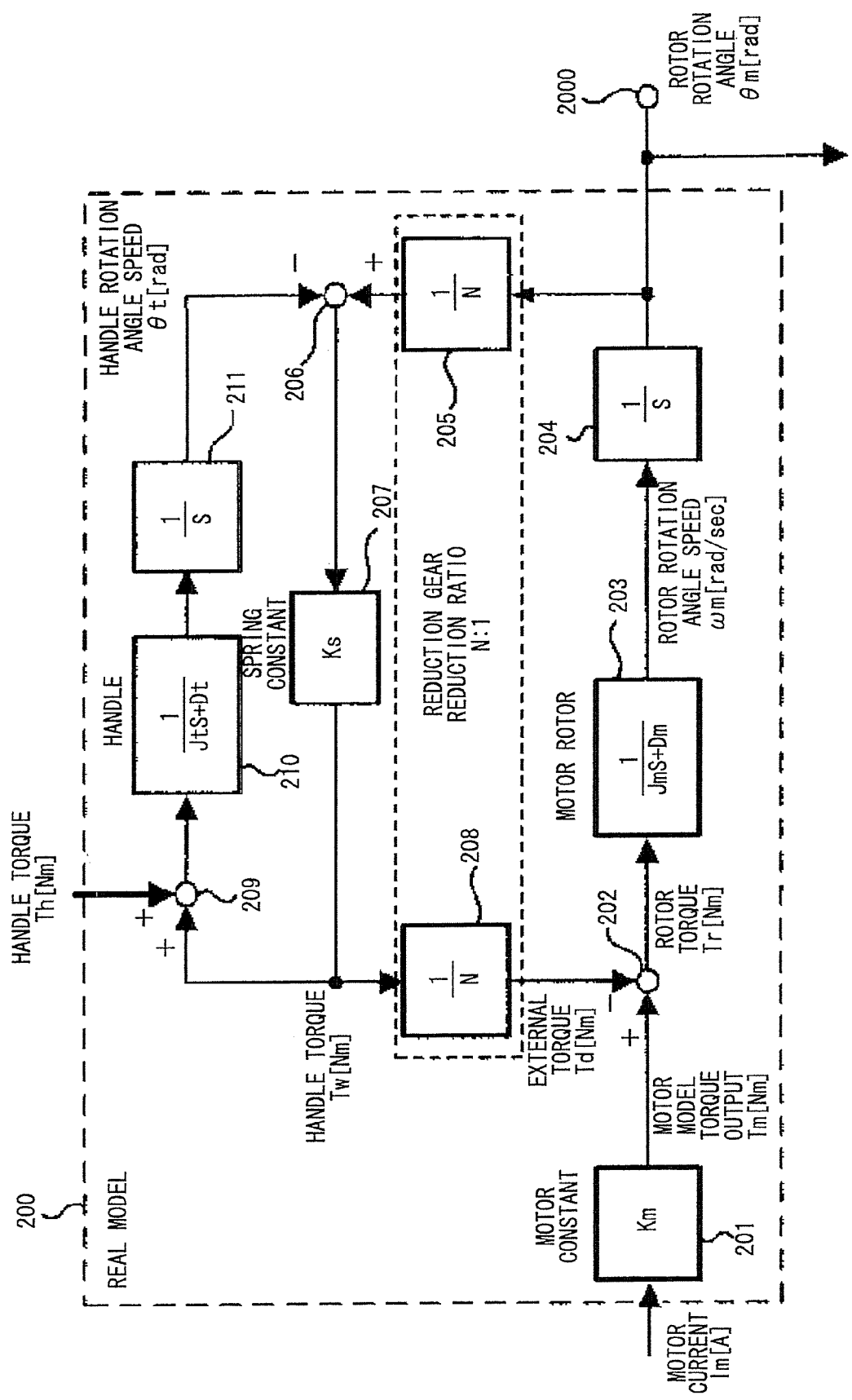
FIG. 17B is a structure diagram showing the detail of a real model of FIG. 17A.
Figure 17C:
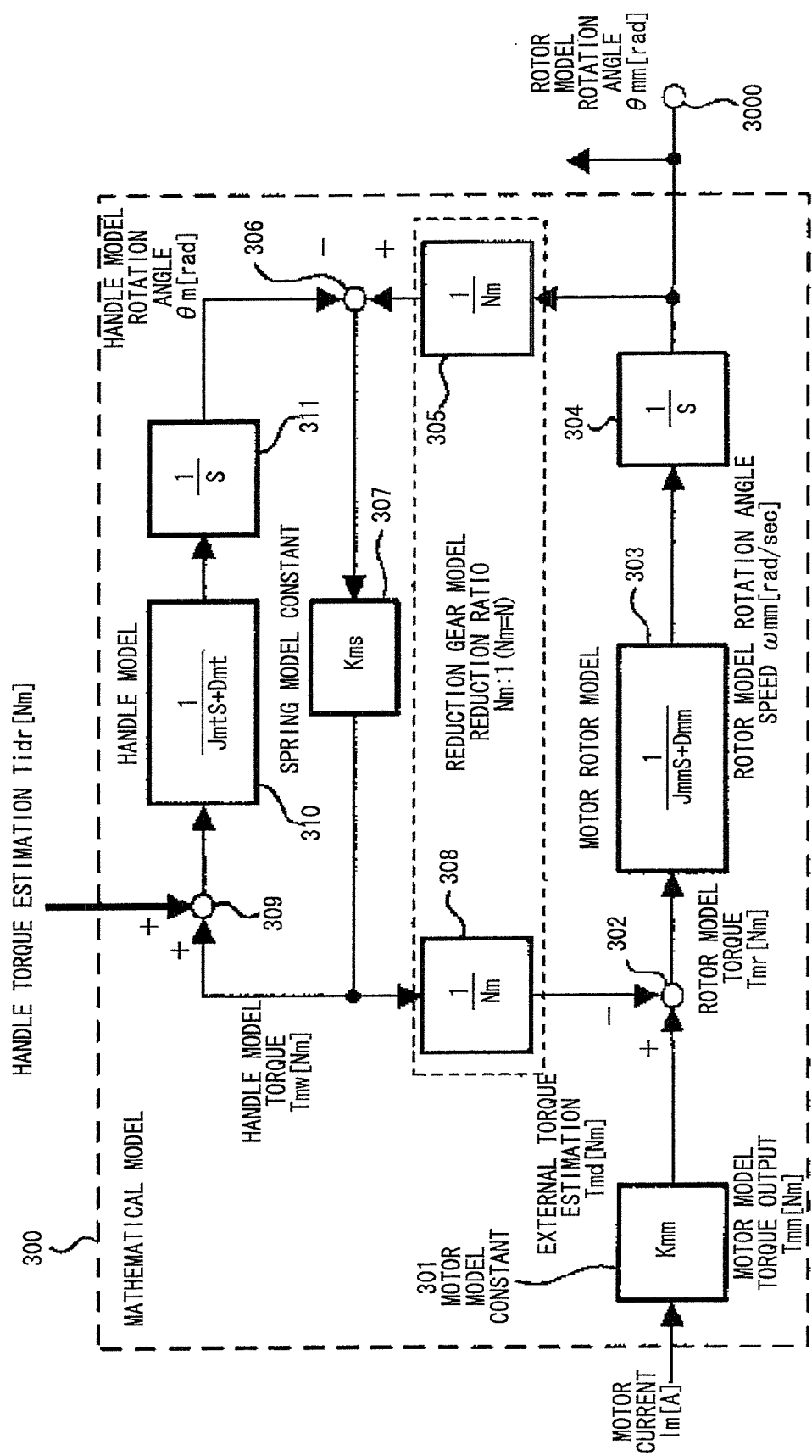
FIG. 17C is a structure diagram showing the detail of a mathematical model of FIG. 17A.

Referring to FIGS. 17A to 17C, the internal structure of FIG. 17B is the same as a control model of the handle system shown in FIG. 16. Specifically, a rotation command ωref is supplied to an input terminal 1000 of FIG. 17A. The rotation command ωref is then supplied to a speed controller 102 through a subtractor 101 in a motor control device 100. The speed controller 102 performs a PI (Proportional/Integral) control and has the characteristics of {Kp} as illustrated in the figure.

An output signal of the speed controller 102 is supplied to a handle torque compensator 103. The handle torque compensator 103 adds a compliance gain [Kcomp], which is described later, to the received signal. A motor torque command Tref[Nm] is thereby obtained from the handle torque compensator 103. The motor torque command Tref[Nm] is converted into a motor current Im[A] by an amplifier 104 having a gain [Kamp].

The motor current Im[A] that is converted in the amplifier 104 is then supplied to a motor of a real model 200. The motor is represented by a motor constant [Km] 201, and a motor torque output Tm[Nm] is obtained from the motor constant 201. The motor torque output Tm[Nm] is supplied to a subtractor 202 where an external torque Td[Nm] is subtracted from the motor torque output Tm[Nm], so that a rotor torque Tr[Nm] is obtained.

The rotor torque Tr[Nm] is supplied to a motor rotor 203 having the characteristics of {1/(JmS+Dm)}, from which a rotor rotation angle speed ωm[rad/esc] is obtained. The rotor rotation angle speed ωm[rad/esc] is then supplied to a computing unit 204 having the characteristics of {1/S}, from which a rotor rotation angle θm[rad] is calculated. The calculated rotor rotation angle θm[rad] is output to an output terminal 2000 and also fed back to the subtractor 101.

The rotor rotation angle θm[rad] from the computing unit 204 is also supplied to a converter 205 having the characteristics of {1/N} that constitutes a reduction gear with a reduction ratio of N:1. Then, a reduced speed signal is supplied to a spring constant [Ks] 207 through a subtractor 206 and converted into a handle torque Tw[Nm]. The handle torque Tw[Nm] from the spring constant [Ks] 207 is then supplied as an external torque Td[Nm] to the subtractor 202 through a converter 208 having the characteristics of {N} that constitutes a reduction gear.

Further, a handle torque Th[Nm] is added to the handle torque Tw[Nm] from the spring constant [Ks] 207 in an adder 209, and the result is supplied to a handle 210 having the characteristics of {1/JtS+Dt}. A rotation angle speed of the handle 210 is supplied to a computing unit 211 having the characteristics of {1/S}, from which a handle rotation angle θt[rad] is obtained and supplied to the subtractor 206.

In the real model 200, the motor constant 201 is driven according to the motor current Im[A], and the external torque Td[Nm] is subtracted from the motor torque output Tm[Nm] to produce the rotor torque Tr[Nm]. Then, the rotor rotation angle θm[rad] is obtained based on the rotor torque Tr[Nm]. The external torque Td[Nm] that is subtracted from the motor torque output Tm[Nm] is affected by a road friction torque Fdr×r[Nm], and the rotor rotation angle θm[rad] for the motor current Im[A] in the state affected by the handle torque Th[Nm] is output to the output terminal 2000.

For such a real model 200, a mathematical model 300 that simulates the above-described real model 200 is placed in the motor control device 100. The motor control device 100 (motor control unit) that includes the mathematical model 300 is an example of an estimation unit. The mathematical model 300 analyzes a function of the real model 200 and implements the function by computer simulation. Although such a program is generally in the form of a program list or the like, the following description is provided with reference to the functional blocks shown in FIGS. 17A to 17C in order to facilitate understanding.

In the mathematical model 300, the motor current Im[A] that is converted by the amplifier 104 is supplied to a motor model constant [Kmm] 301 of the mathematical model 300, and a motor torque output Tmm[Nm] is obtained form the motor model constant 301. The motor torque output Tmm [Nm] is supplied to a subtractor 302 where an external torque estimation Tmd[Nm] is subtracted from the motor torque output Tmm[Nm], so that a rotor model torque Tmr[Nm] is obtained.

The rotor model torque Tmr[Nm] is supplied to a motor rotor model 303 having the characteristics of {1/(JmmS+Dmm)}, from which a rotor model rotation angle speed ωmm [rad/esc] is obtained.

The rotor model rotation angle speed ωmm[rad/esc] is then supplied to a computing unit 304 having the characteristics of {1/S}, from which a rotor model rotation angle θmm[rad] is calculated. The calculated rotor model rotation angle θmm [rad] is output to an output terminal 3000.

The rotor model rotation angle θmm[rad] from the computing unit 304 is also supplied to a converter 305 having the characteristics of {1/Nm} (where Nm=N) that constitutes a reduction gear model with a reduction ratio of N:1. Then, a reduced speed signal is supplied to a spring model constant [Kms] 307 through a subtractor 306 and converted into a handle model torque Tmw[Nm]. The handle model torque Tmw[Nm] from the spring model constant [Kms] 307 is then supplied as an external torque estimation Tmd[Nm] to the subtractor 302 through a converter 308 having the characteristics of {N} that constitutes a reduction gear model.

Further, a handle torque estimation Tidr[Nm] is added to the handle model torque Tmw[Nm] from the spring model constant 307 in an adder 309, and the result is supplied to a handle model 310 having the characteristics of {1/JmtS+Dmt}. A rotation angle speed of the handle model 310 is supplied to a computing unit 311 having the characteristics of {1/S}, from which a handle model rotation angle θmt[rad] is obtained and supplied to the subtractor 306.

In the mathematical model 300, the motor model constant 301 is driven according to the motor current Im[A], and the external torque estimation Tmd[Nm] is subtracted from the motor model torque output Tmm[Nm] to produce the rotor model torque Tmr[Nm]. Then, the rotor model rotation angle θmm[rad] is obtained based on the rotor model torque Tmr [Nm].

The external torque estimation Tmd[Nm] that is subtracted from the motor model torque output Tmm[Nm] is affected by the handle torque estimation Tidr[Nm], and the rotor model rotation angle θmm[rad] for the motor current Im[A] in the state affected by the handle torque estimation Tidr[Nm] is output to the output terminal 3000.

Thus, the output terminal 3000 of the mathematical model 300 obtains the rotor model rotation angle θmm[rad] for the motor current Im[A] which is in the state affected by the handle torque estimation Tidr[Nm]. On the other hand, the output terminal 2000 of the real model 200 obtains the rotor rotation angle θm[rad] for the motor current Im[A] which is in the state affected by the handle torque Th[Nm].

Therefore, the handle torque estimation Tidr[Nm] is controlled so as to equalize the rotor model rotation angle θmm [rad] and the the rotor rotation angle θm[rad]. The controlled handle torque estimation Tidr[Nm] can be thereby equal to the handle torque Tw[Nm].

This is because it is assumed that the requirements would be exactly the same between the real model 200 and the mathematical model 300 except for the handle torque Th[Nm] and the handle torque estimation Tidr[Nm], and thus a difference between the rotor rotation angle θm[rad] and the rotor model rotation angle θmm[rad] would be caused only due to a difference between the handle torque Tw[Nm] and the handle torque estimation Tidr[Nm].

In the above-described relationship between the real model 200 and the mathematical model 300, the value of each element is: Kmm=Km[Nm/A], Jmm=Jm[kg/sec$^2$], Dmm=Dm [Nm/(rad/sec)], Nm=N, Kms=Ks[Nm/rad], Jmt=Jt[kg/sec$^2$], and Dmt=Dt[Nm/(rad/sec)]. Such a control is called a "model reference adaptive control".

In order to implement the above control, the structure of FIGS. 17A to 17C supplies the rotor model rotation angle θmm[rad] and the rotor rotation angle θm[rad] to a subtractor 106 to obtain a difference as a model error Em. It then supplies the model error Em to an estimator 400 having a gain {Kadp+(Kadi/S)} and controls a value of the handle torque estimation Tidr[Nm] that is produced in the estimator 400.

Figure 18:
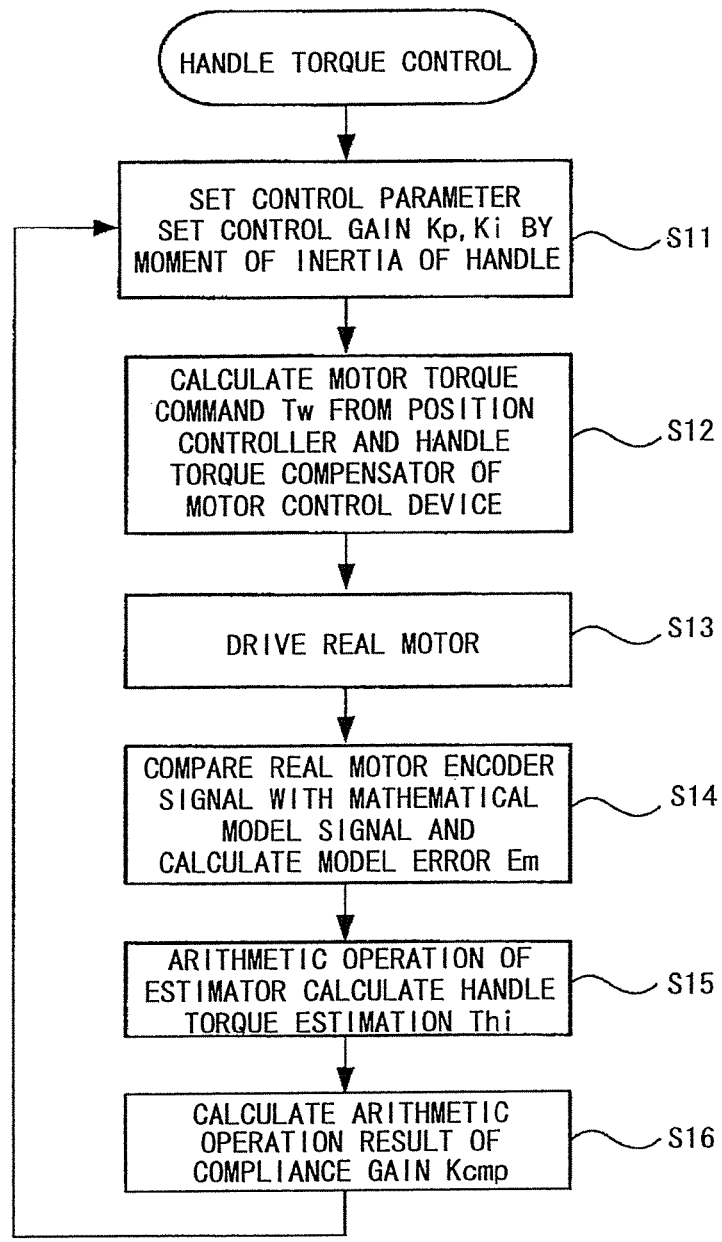
FIG. 18 is a flowchart to describe a handle torque control.

The handle torque estimation Tidr[Nm] that is equal to the handle torque Th[Nm] is thereby obtained. The structure of FIGS. 17A to 17C further supplies the obtained handle torque estimation Tidr[Nm] to a setting unit 107 having a compliance gain Kcomp, which is supplied to handle torque compensator 103, and sets the compliance gain Kcomp. FIG. 18 is a flowchart showing a process that is executed in the motor control device 100 to set the compliance gain Kcomp.

Referring to FIG. 18, after the start of the handle torque control, the first Step S11 sets a control parameter and specifically sets control gains Kp and Ki according to the moment of inertia of a handle. The next Step S12 calculates a motor torque command Tw from a position controller and a handle torque compensator of the motor control device. Further, the Step S13 calculates a motor torque command Tref by the speed controller 102 and a skid prevention regulator of the motor control device 100 and drives the real motor according to the motor torque command Tref.

Then, the Step S14 compares an encoder signal (rotor rotation angle θm[rad]) of the real motor with a mathematical model signal (rotor model rotation angle θmm[rad]) and calculates a model error Em. The Step 15 calculates a handle torque estimation Tidr[Nm] by the process in the estimator 400. Finally, the Step S16 calculates a computing result of a compliance gain Kcomp.

The above-described embodiment controls the handle torque estimation that is applied to the mathematical model so as to equalize a rotation value of a given part of the mathematical model for handle driving and a simulated rotation value of a corresponding part of the actual handle driving.

Further, it limits the level of a motor torque command signal so that the handle driving motor torque does not exceed the applied handle torque estimation. This enables suitable handle control.

In an existing device, if a handle torque Th is exerted as an external torque, for example, the motor control device generates a feedback torque so as to correspond to a rotation angle command, and thereby the motor generates a torque for maintaining the handle at a commanded angle. This causes a problem that the displacement of a handle angle is small in spite of the exertion of a handle torque. The present invention provides an easy solution for such a problem.

FIGS. 19A to 19F show the state of signals in the device according to the present invention by simulation. FIGS. 19A to 19F illustrate a change by the estimation of a handle torque in an estimator in response to a change in a handle torque on simulation. The device of the present invention estimates a handle torque correctly in the way as shown in FIGS. 19A to 19F.

Figure 19A:
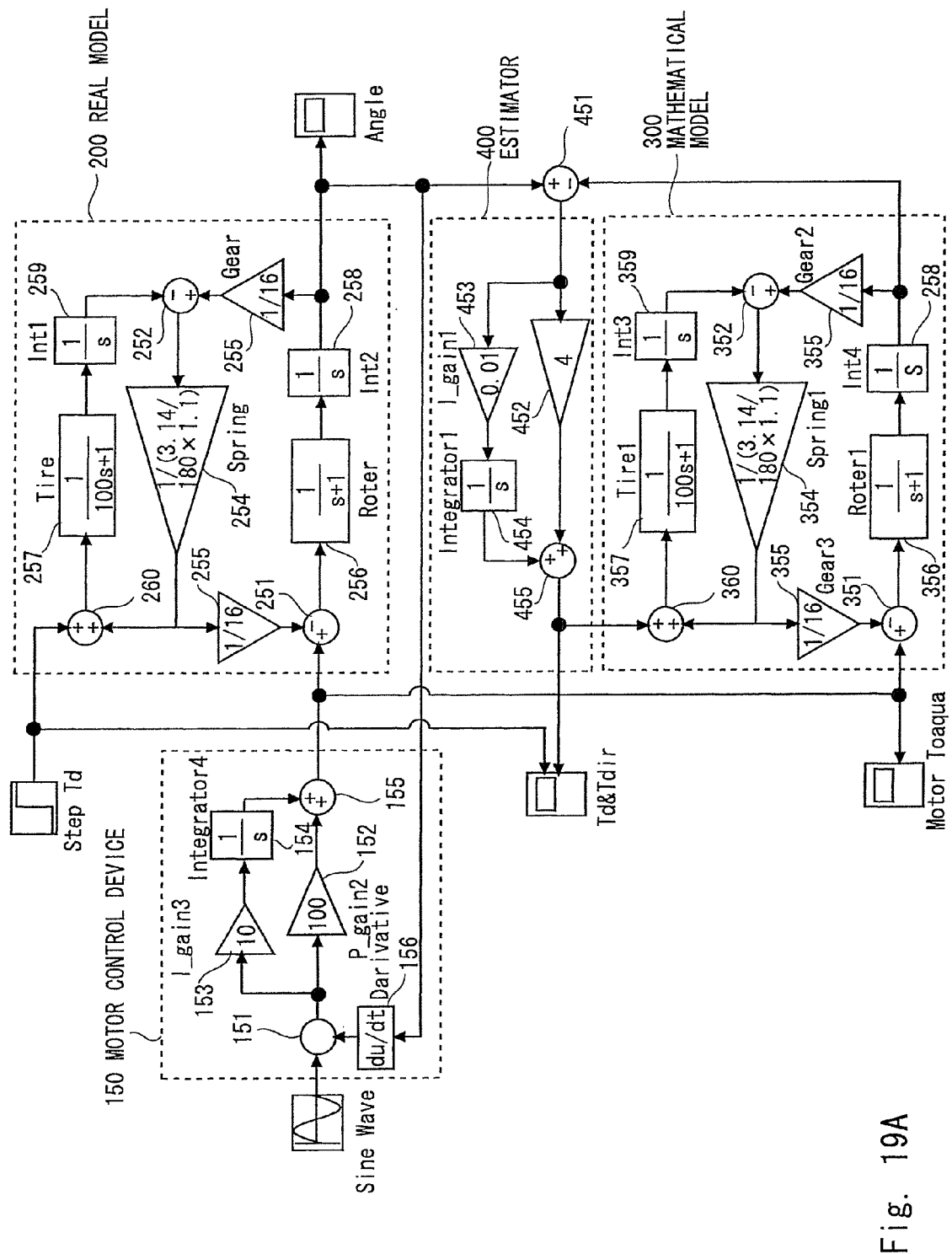
FIG. 19A is a view showing a structural example of a control device.

Referring to FIG. 19A, a motor control device 150 includes a subtractor 151, amplifiers 152 and 153, an integrator 154, an adder 155, and a differentiator 156. The real model 200 includes subtractors 251 and 252, amplifiers 253, 254 and 255, computing units 256 and 257, integrators 258 and 259, and an adder 260.

The mathematical model 300 includes subtractors 351 and 352, amplifiers 353, 354 and 355, computing units 356 and 357, integrators 358 and 359, and an adder 360. The estimator 400 includes a subtractor 451, amplifiers 452 and 453, an integrator 454, and an adder 455. In FIG. 19A, each coefficient of the mathematical model is the same value as that of the real model.

Specifically,
Kmm=Km [Nm/A],
Jmm=Jm [kg/sec^2],
Dmm=Dm [Nm/(rad/sec)],
Nm=N,
Kms=Ks [Nm/rad],
Jmt=Jt [kg/sec^2],
Dmt=Dt [Nm/(rad/sec)], and
Kadp, Kadi is a proportional/integral gain of an estimator.

An estimator is designed so as to set a model error Em to zero in such a system. In this example, a PI controller designs a. Kadp,Kadi estimation gain of an estimator. The calculated handle torque estimation Thi is equal to the handle torque Th.

Figure 19B:
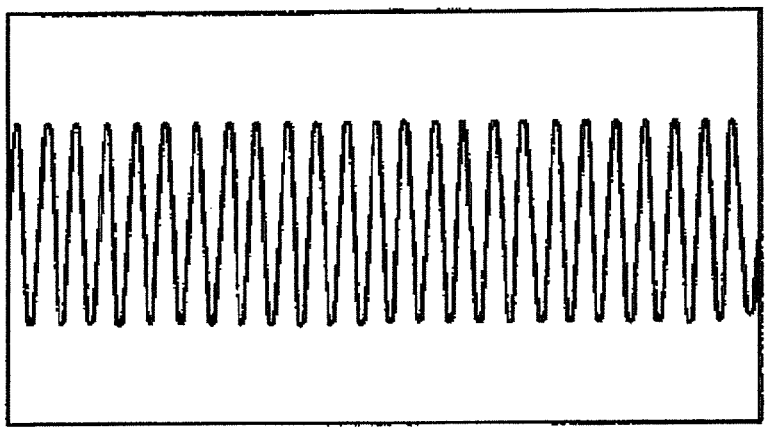
FIG. 19B is a waveform chart showing an example of a signal in a simulation using the control device of FIG. 19A.
Figure 19C:
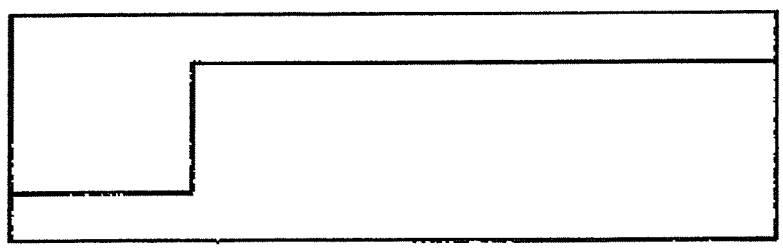
FIG. 19C is a waveform chart showing an example of a signal in a simulation using the control device of FIG. 19A.
Figure 19D:
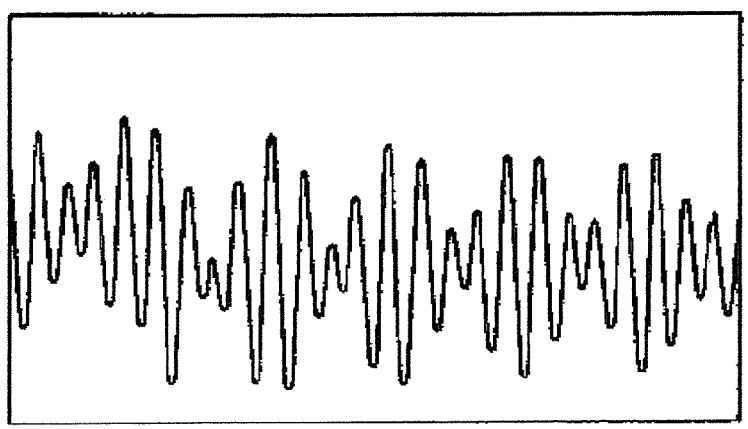
FIG. 19D is a waveform chart showing an example of a signal in a simulation using the control device of FIG. 19A.
Figure 19E:
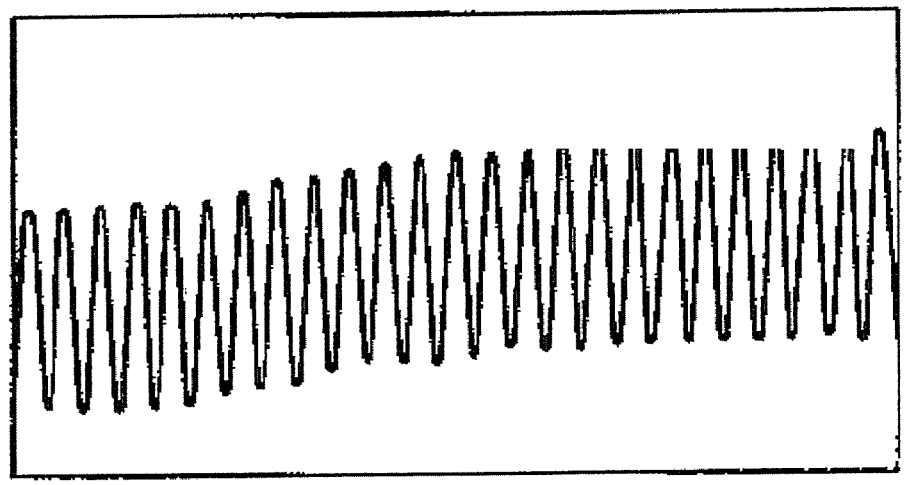
FIG. 19E is a waveform chart showing an example of a signal in a simulation using the control device of FIG. 19A.
Figure 19F:
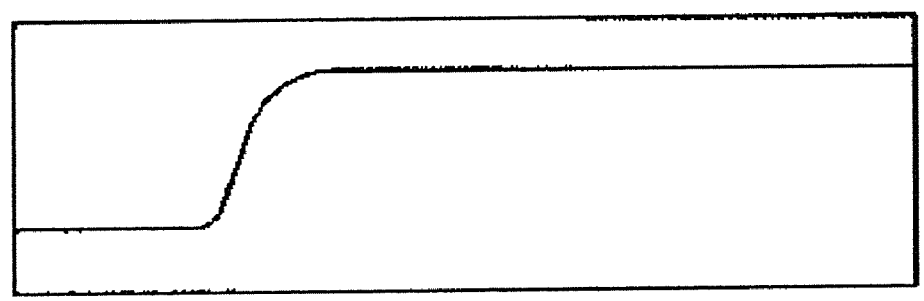
FIG. 19F is a waveform chart showing an example of a signal in a simulation using the control device of FIG. 19A.

If a sine wave signal as shown in the waveform chart of FIG. 19B is supplied to the subtractor 151 and a step wave handle torque Td[Nm] as shown in the waveform chart of FIG. 19C is supplied to the adder 260 in this device, a motor torque command Tref[Nm] as shown in the waveform chart of FIG. 19D is produced, and the rotor rotation angle θm[rad] as shown in the waveform chart of FIG. 19E is obtained. A handle torque estimation Tidr[Nm] thereby changes as shown in the waveform chart of FIG. 19F.

Figure 20A:
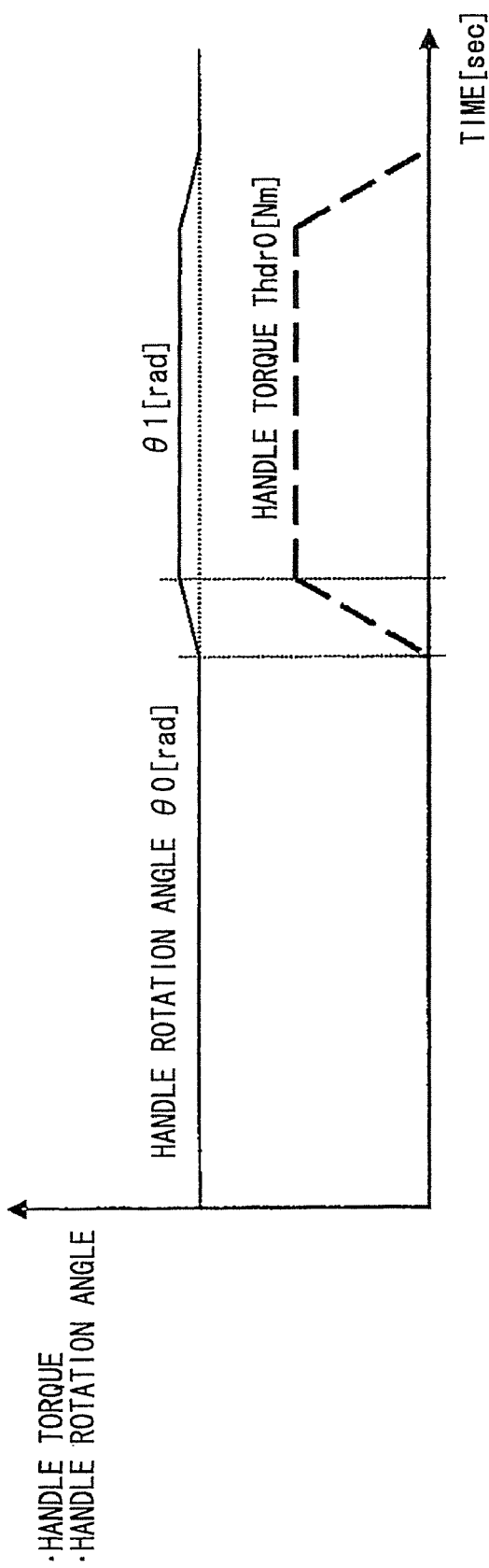
FIG. 20A is a view to describe the relationship between a handle torque and a handle rotation angle.
Figure 20B:
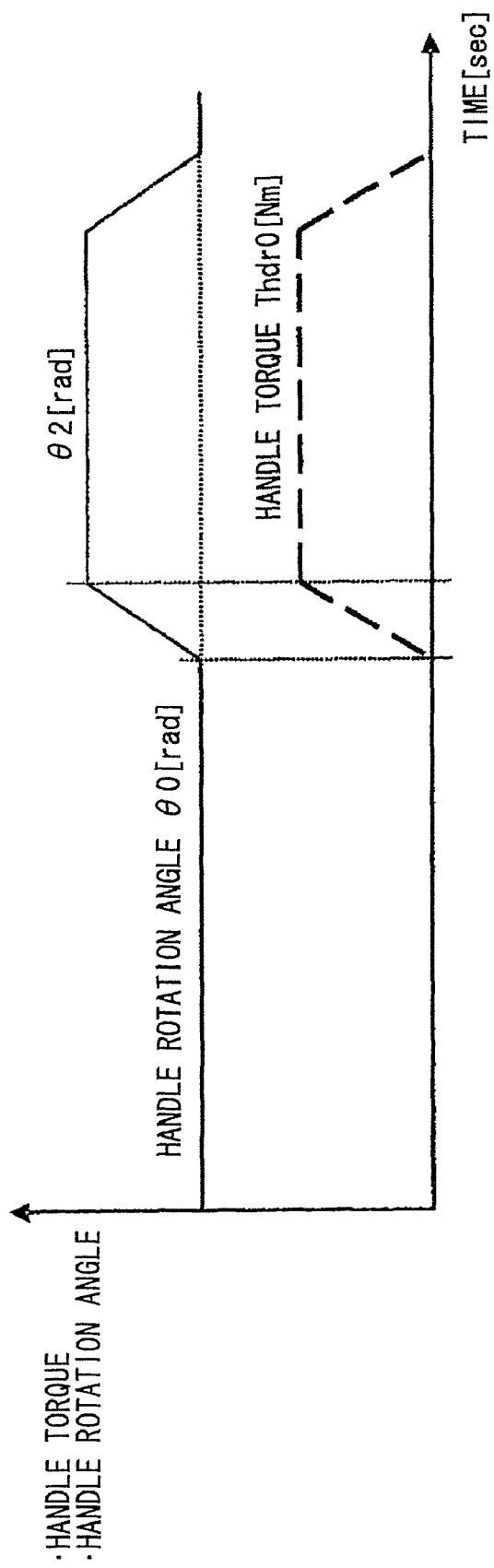
FIG. 20B is a view to describe the relationship between a handle torque and a handle rotation angle.
Figure 21A:
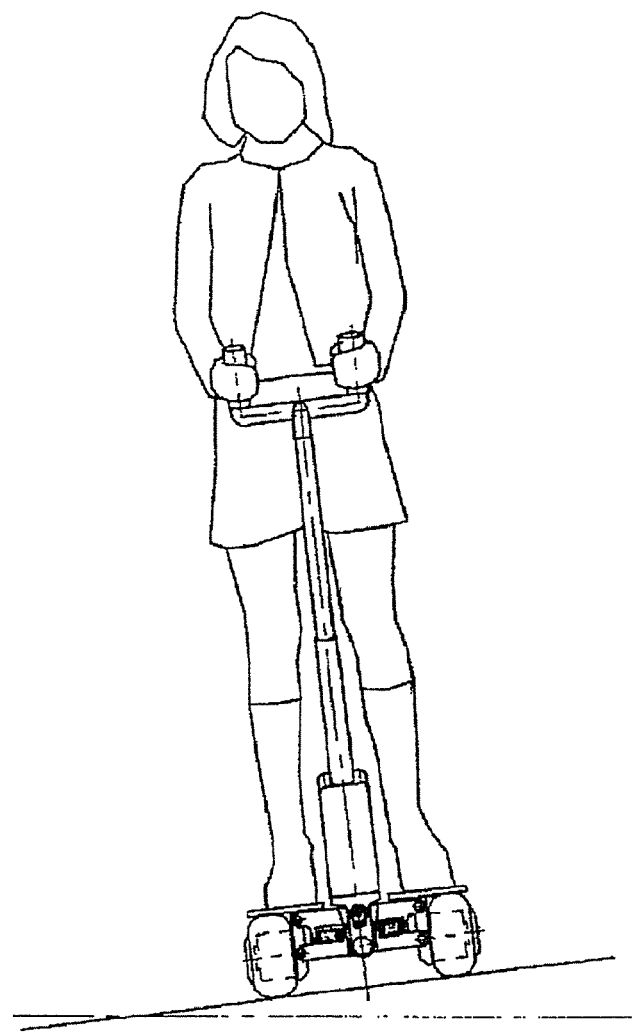
FIG. 21A is a view to describe a related art.
Figure 21B:
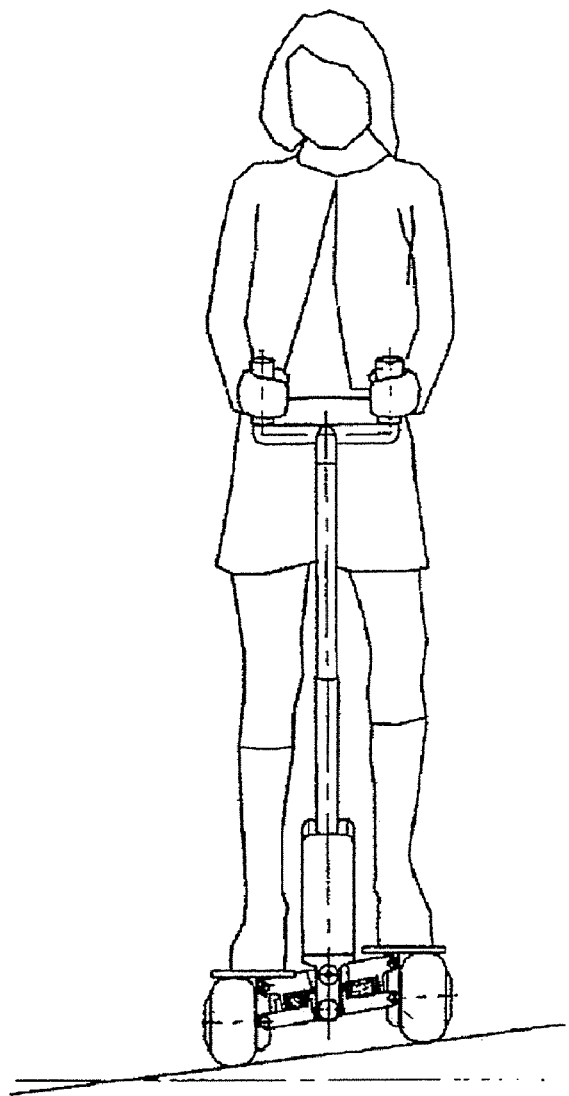
FIG. 21B is a view to describe a related art.
Figure 21C:
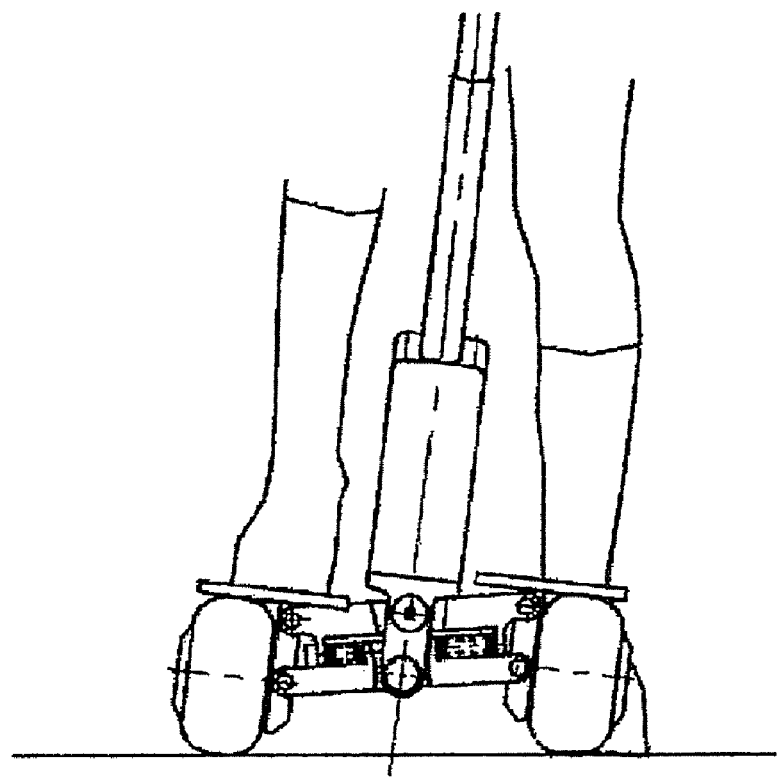
FIG. 21C is a view to describe a related art.

Consider the case where a handle rotation angle changes from θ0[rad] to θ1[rad] as shown in FIGS. 20A and 20B. According to a related art, a handle rotation angle does not change largely in spite of a large change in the handle torque Thdr0[Nm] as shown in FIG. 20A. On the other hand, according to the present invention, a handle rotation angle θ2[rad] in accordance with the handle torque Thdr0[Nm] is obtained as shown in FIG. 20B, thus enabling a control of a handle rotation angle to a desired level.

As described in the foregoing, a travel device according to an embodiment of the present invention includes a plurality of wheels disposed in parallel, a step plate mounted between the plurality of wheels for a driver to place feet, and a handle mounted vertically to the step plate. In this device, at least one of the step plate and the handle is capable of tilting in a roll axis direction. The device further includes a tilt driving unit to drive at least one of the step plate and the handle to tilt in the roll axis direction and a control unit to control the tilt driving unit, and controls the tilt driving unit so as to maintain at least one of the step plate and the handle in a horizontal position or vertical position. This enables a suitable control of the handle and the step at a desired angle.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

The invention claimed is:

1. A travel device, comprising:
a plurality of wheels disposed in parallel;
a step plate mounted between the plurality of wheels for a driver to place feet;
a handle mounted vertically to the step plate;
a vehicle body between the plurality of wheels, the vehicle body supporting the step plate;
a driving motor to allow the step plate and/or the handle to tilt in a roll axis direction, and to drive at least one of the step plate and the handle to tilt in the roll axis direction; and
a control unit to control the driving motor to maintain at least one of a horizontal position of the step plate and a vertical position of the handle; and
a measurement unit to measure a shift operation of at least one of the step plate and the handle from a neutral position in at least one of a horizontal state of the step plate and a vertical state of the handle maintained by the driving motor,
wherein the plurality of wheels change a traveling direction according to a value measured by the measurement unit,
wherein the step plate and/or the handle are able to tilt in a roll axis direction with respect to the vehicle body,
wherein the handle and the step plate are coupled to each other by a link mechanism that maintains a perpendicular relationship between the handle and the step plate, and
wherein the driving motor drives the handle to tilt in the roll axis direction, and the step plate is thereby controlled through the link mechanism.

2. A travel device, comprising:
a plurality of wheels disposed in parallel;
a step plate mounted between the plurality of wheels for a driver to place feet;
a handle mounted vertically to the step plate;
a driving motor to allow the step plate and/or the handle to tilt in a roll axis direction, and to drive at least one of the step plate and the handle to tilt in the roll axis direction; and
a control unit to control the driving motor to maintain at least one of a horizontal position of the step plate and a vertical position of the handle; and
a measurement unit to measure a shift operation of at least one of the step plate and the handle from a neutral position in at least one of a horizontal state of the step plate and a vertical state of the handle maintained by the driving motor,
wherein the plurality of wheels change a traveling direction according to a value measured by the measurement unit,
wherein the control unit controls the driving motor so as to rotate the step plate and/or the handle in the roll axis direction based on the value measured by the measurement unit, thereby returning at least one of the step plate and the handle to the neutral position,
wherein the handle and the step plate are coupled to each other by a link mechanism that maintains a perpendicular relationship between the handle and the step plate, and
wherein the driving motor drives the step plate to tilt in the roll axis direction, and the handle is thereby controlled through the link mechanism.

* * * * *